(12) United States Patent
Guo et al.

(10) Patent No.: US 12,273,445 B2
(45) Date of Patent: Apr. 8, 2025

(54) KEY MANAGEMENT METHOD, DEVICE, AND SYSTEM

(71) Applicant: HUAWEI TECHNOLOGIES CO., LTD., Guangdong (CN)

(72) Inventors: Longhua Guo, Shanghai (CN); He Li, Shanghai (CN); Rong Wu, Shenzhen (CN); Yizhuang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 231 days.

(21) Appl. No.: 18/050,977

(22) Filed: Oct. 28, 2022

(65) Prior Publication Data

US 2023/0086032 A1 Mar. 23, 2023

Related U.S. Application Data

(63) Continuation of application No. PCT/CN2021/090348, filed on Apr. 27, 2021.

(30) Foreign Application Priority Data

Apr. 30, 2020 (CN) .......................... 202010368028.6

(51) Int. Cl.
*H04L 9/08* (2006.01)
*H04L 9/14* (2006.01)
*H04L 67/141* (2022.01)

(52) U.S. Cl.
CPC .......... *H04L 9/0866* (2013.01); *H04L 9/0825* (2013.01); *H04L 9/14* (2013.01); *H04L 67/141* (2013.01)

(58) Field of Classification Search
None
See application file for complete search history.

(56) References Cited

U.S. PATENT DOCUMENTS

2013/0014231 A1   1/2013   Chu et al.

FOREIGN PATENT DOCUMENTS

| CN | 101079705 A | 11/2007 |
| CN | 102014381 B | 12/2012 |

(Continued)

OTHER PUBLICATIONS

ETSI, "Authentication and Key Management for Applications (AKMA) based on 3GPP credentials in the 5G System (5GS) (3GPP TS 33.535 version 16.2.0 Release 16)", Jan. 2021, pp. 1-21 (Year: 2021).*

(Continued)

*Primary Examiner* — Clayton R Williams

(57) ABSTRACT

This application provides a key management method, a device, and a system. The method includes: A terminal device sends a first application session establishment request message to a first application function network element, where the establishment request message carries identification information of a first key, and the first key is an authentication and key management for applications AKMA key. The terminal device receives a first authentication request message in a procedure of the re-authentication. The terminal device sends a response message for the first authentication request message in the procedure of the re-authentication. The terminal device receives a response message for the establishment request message. The terminal device derives a communication key between the terminal device and the first application function network element by using the first key.

20 Claims, 14 Drawing Sheets

(56) References Cited

FOREIGN PATENT DOCUMENTS

| CN | 107005842 A | 8/2017 | | |
|---|---|---|---|---|
| CN | 110022206 A | 7/2019 | | |
| EP | 2207301 A1 | 7/2010 | | |
| EP | 3531732 B1 | * | 1/2023 | ......... H04L 63/0869 |
| WO | WO-2018201398 A1 | * | 11/2018 | ........... H04L 63/061 |

OTHER PUBLICATIONS

3GPP TSG-SA WG3 Meeting #95Bis,S3-192000,Solution 2 evaluation,Ericsson,Sapporo(Japan), Jun. 24-28, 2019, total 4 pages.

Huawei Hisilicon, "Add details on deleting Kakma", 3GPP TSG-SA3 Meeting #98e S3-200258,Feb. 21, 2020,total 3 pages.

3GPP TS 33.535 V0.4.0 :"3rd Generation Partnership Project;Technical Specification Group Services and System Aspects;Authentication and key management for applications; based on 3GPP credential in 5G AKMA (Release 16)",Apr. 2020,total 15 pages.

Nokia Nokia Shanghai Bell China Mobile, "Implicit bootstrapping using NEF as the AKMA Anchor Function", 3GPP TSG-SA WG3 Meeting #95 Bis S3-192220, Jun. 17, 2019,total 4 pages.

3GPP TS 33.501 V16.2.0 (Mar. 2020), 3rd Generation Partnership Project; Technical Specification Group Services and System Aspects; Security architecture and procedures for 5G system(Release 16), 227 pages.

Ericsson, "Solution Key lifetimes", 3GPP TSG-SA WG3 Meeting #96 Ad-hoc S3-193595, Oct. 7, 2019,total 3 pages.

NEC Intel, "Solution to support Fast Re-authentication in 5GS", 3GPP TSG-SA WG3 Meeting #94Ad-Hoc S3-190634, Mar. 4, 2019,total 3 pages.

3GPP TR 33.835 V16.0.0 (Dec. 2019), 3rd Generation Partnership Project; Technical Specification Group Services and System Aspects; Study on authentication and key management for applications based on 3GPP credential in 5G (Release 16), 83 pages.

ZTE Corporation, Processing of KAKMA failure from AUSF to AAnF. 3GPP TSG-SA3 Meeting #98bis-e, e-meeting, Apr. 14-17, 2020, S3-200676, 1 page.

* cited by examiner

KEY MANAGEMENT METHOD, DEVICE, AND SYSTEM

CROSS-REFERENCE TO RELATED APPLICATIONS

This application is a continuation of International Application No. PCT/CN2021/090348, filed on Apr. 27, 2021, which claims priority to Chinese Patent Application No. 202010368028.6, filed on Apr. 30, 2020. The disclosures of the aforementioned applications are hereby incorporated by reference in their entireties.

TECHNICAL FIELD

This application relates to the field of communication technologies, and in particular, to a key management method, a device, and a system.

BACKGROUND

Currently, a terminal device may support an authentication and key management for applications (authentication and key management for applications, AKMA) service. In the AKMA service, data transmission is performed between the terminal device and an application function network element, and the terminal device and the application function network element need to agree on a communication key between the terminal device and the application function network element. The communication key may be used to perform identity authentication and communication protection. The application function network element obtains the communication key between the terminal device and the application function network element from an AKMA anchor function network element, and the AKMA anchor function network element generates the communication key between the terminal device and the application function network element based on an AKMA key. The AKMA anchor function network element may obtain the AKMA key from an authentication server function network element corresponding to the terminal device.

However, occurrence of re-authentication is not considered in a current AKMA procedure, and the re-authentication causes update and deletion of the AKMA key. In this case, how to ensure that the terminal device and the application function network element successfully agree on the communication key between the terminal device and the application function network element is an urgent problem to be resolved.

SUMMARY

This application provides a key management method, a communication apparatus, and a communication system, to ensure that a terminal device and an application function network element can still successfully agree on a communication key between the terminal device and the application function network element after re-authentication occurs in an AKMA procedure.

According to a first aspect, this application provides a key management method. The method includes: A terminal device sends a first application session establishment request message to a first application function network element, where the first application session establishment request message carries identification information of a first key, and the first key is an authentication and key management for applications AKMA key. The terminal device receives a first authentication request message in a procedure of the re-authentication. The terminal device sends a response message for the first authentication request message in the procedure of the re-authentication. The terminal device receives a response message for the first application session establishment request message from the first application function network element. The terminal device derives a communication key between the terminal device and the first application function network element by using the first key.

In the method, after re-authentication occurs, the terminal device still derives a communication key between the terminal device and an application function network element by using a first key generated before the re-authentication, to ensure that the communication key between the terminal device and the application function network element obtained by the application function network element is consistent with the communication key derived by the terminal device. Therefore, it is ensured that the terminal device and the application function network element successfully agree on the communication key between the terminal device and the application function network element, to implement secure communication between the terminal device and the application function network element. The method can further avoid interruption of an application session service, reduce a service latency, and improve user experience.

In a possible design, the terminal device does not delete the first key and the identification information of the first key after sending the response message for the first authentication request message.

In a possible design, the terminal device does not delete the first key and the identification information of the first key if the procedure of the re-authentication succeeds.

In a possible design, the terminal device does not delete the first key and the identification information of the first key if the terminal device sends the first application session establishment request message before the procedure of the re-authentication, and does not receive the response message for the first application session establishment request message.

In a possible design, the terminal device does not delete the first key and the identification information of the first key if the terminal device sends the first application session establishment request message before the procedure of the re-authentication, and receives the response message for the first application session establishment request message but does not derive the communication key between the terminal device and the first application function network element.

In a possible design, the terminal device does not delete the first key and the identification information of the first key if the terminal device does not derive the communication key between the terminal device and the first application function network element.

In a possible design, the terminal device determines to derive the communication key between the terminal device and the first application function network element by using the first key after receiving the response message for the first application session establishment request message.

In a possible design, the terminal device generates a second key after sending the response message for the first authentication request message, where the second key is an AKMA key.

In a possible design, the terminal device determines to derive the communication key between the terminal device and the first application function network element by using the first key when determining that the first application session establishment request message is sent before the procedure of the re-authentication.

In a possible design, the terminal device determines to derive the communication key between the terminal device and the first application function network element by using the first key when determining that the first application session establishment request message carries the identification information of the first key.

In a possible design, the terminal device determines, based on the identification information of the first key in a first application session context, that the first application session establishment request message carries the identification information of the first key.

In a possible design, the terminal device stores a sequence of sending the first application session establishment request message and performing the procedure of the re-authentication after sending the response message for the first authentication request message.

In a possible design, the terminal device deletes the first key and the identification information of the first key when each application session request message that carries the identification information of the first key is responded to.

In a possible design, the terminal device deletes the first key and the identification information of the first key when each application session request message for which the terminal device does not obtain a response message is sent after the procedure of the re-authentication.

In a possible design, the terminal device sends a second application session establishment request message to a second application function network element after sending the response message for the first authentication request message, where the second application session establishment request message carries identification information of the second key, and the second key is the AKMA key.

In a possible design, the terminal device further derives the communication key between the terminal device and the first application function network element by using the identification information of the first key or identification information of the first application function network element.

According to a second aspect, this application provides a key management method. The method includes: An authentication server function network element receives a second authentication request in a procedure of re-authentication. The authentication server function network element sends a response message for the second authentication request in the procedure of the re-authentication. The authentication server function network element receives a first key request message from an authentication and key management for applications AKMA anchor function network element, where the first key request message carries identification information of a first key, and the first key is an AKMA key generated before the procedure of the re-authentication. The authentication server function network element sends the first key to the AKMA anchor function network element.

In the method, after re-authentication occurs, the authentication server function network element still sends, to the AKMA anchor function network element, the first key generated before the re-authentication, so that the AKMA anchor function network element generates a communication key between a terminal device and an application function network element by using the first key, to ensure that the communication key between the terminal device and the application function network element generated by the terminal device is consistent with the communication key between the terminal device and the application function network element obtained by the application function network element. Therefore, it is ensured that the terminal device and the application function network element successfully agree on the communication key between the terminal device and the application function network element, to implement secure communication between the terminal device and the application function network element. The method can further avoid interruption of an application session service, reduce a service latency, and improve user experience.

In a possible design, the authentication server function network element does not delete the first key and the identification information of the first key after sending the response message for the second authentication request.

In a possible design, the authentication server function network element receives a first indication from the terminal device, where the first indication indicates not to delete the first key and the identification information of the first key.

In a possible design, the first indication is carried in the second authentication request.

In a possible design, the authentication server function network element does not delete the first key and the identification information of the first key when the procedure of the re-authentication succeeds.

In a possible design, the authentication server function network element generates a second key after sending the response message for the second authentication request, where the second key is an AKMA key.

In a possible design, the authentication server function network element determines the first key based on the identification information of the first key.

According to a third aspect, this application provides a key management method. The method includes: An authentication and key management for applications AKMA anchor function network element receives a first request message from a first application function network element after a procedure of re-authentication, where the first request message is for requesting a communication key between a terminal device and the first application function network element, the first request message carries identification information of a first key, and the first key is an AKMA key generated before the procedure of the re-authentication. The AKMA anchor function network element derives the communication key between the terminal device and the first application function network element by using the first key. The AKMA anchor function network element sends the communication key to the application function network element.

In the method, after re-authentication occurs, the AKMA anchor function network element still generates the communication key between the terminal device and the application function network element by using the first key generated before the re-authentication, to ensure that the communication key between the terminal device and the application function network element generated by the terminal device is consistent with the communication key between the terminal device and the application function network element obtained by the application function network element. Therefore, it is ensured that the terminal device and the application function network element successfully agree on the communication key between the terminal device and the application function network element, to implement secure communication between the terminal device and the application function network element.

In a possible design, the AKMA anchor function network element does not delete the first key and the identification information of the first key after the procedure of the re-authentication.

In a possible design, the AKMA anchor function network element receives a second indication from the terminal device or an authentication server function network element, where the second indication indicates not to delete the first key and the identification information of the first key.

In a possible design, the AKMA anchor function network element does not delete the first key and the identification information of the first key when the procedure of the re-authentication succeeds.

In a possible design, the AKMA anchor function network element obtains a second key after the procedure of the re-authentication, where the second key is an AKMA key generated after the procedure of the re-authentication.

In a possible design, the AKMA anchor function network element determines the first key based on the identification information of the first key.

According to a fourth aspect, this application provides a key management method. The method includes: A terminal device sends a first application session establishment request message to a first application function network element, where the first application session establishment request message carries identification information of a first key, and the first key is an authentication and key management for applications AKMA key. The terminal device receives a first authentication request message in a procedure of re-authentication. The terminal device sends a response message for the first authentication request message in the procedure of the re-authentication. The terminal device receives a response message for the first application session establishment request message from the first application function network element. The terminal device sends a second application session establishment request message to the first application function network element, where the second application session establishment request message carries identification information of a second key, and the second key is an AKMA key generated after the procedure of the re-authentication.

In the method, before re-authentication occurs, the terminal device initiates an application session establishment procedure to an application function network element by using the identification information of the first key generated before the re-authentication. After the re-authentication occurs, the terminal device re-initiates an application session establishment procedure to the application function network element by using the identification information of the second key generated after the re-authentication. Therefore, it is ensured that the terminal device and the application function network element successfully agree on a communication key between the terminal device and the application function network element, to implement secure communication between the terminal device and the application function network element.

In a possible design, the terminal device determines a first application session establishment failure based on the response message for the first application session establishment request message, and the terminal device sends the second application session establishment request message to the first application function network element.

In a possible design, the response message for the first application session establishment request message includes any one or more of the following: a third indication, a first failure cause value, or a second failure cause value, where the third indication indicates the first application session establishment failure, the first failure cause value indicates that an authentication server function network element cannot be found, the second failure cause value indicates that the first key corresponding to the identification information of the first key cannot be determined, and the authentication server function network element is configured to generate the first key.

In a possible design, the terminal device sends the second application session establishment request message to a first application function network element, which can be a first application server, based on a first identifier, where the first identifier identifies that the procedure of the re-authentication is performed on the terminal device.

In a possible design, the first identifier identifies that the terminal device sends the first application session establishment request message before the procedure of re-authentication is performed.

In a possible design, the terminal device sets the first identifier on the terminal device after the procedure of re-authentication.

In a possible design, if the response message for the first application session establishment request message is securely protected by a communication key between the first application function network element and the terminal device, and the terminal device fails to verify security protection, the terminal device sends the second application session establishment request message to the first application server, where the communication key between the first application function network element and the terminal device is derived from the first key.

In a possible design, if the terminal device fails to perform secure communication with the first application function network element by using the communication key between the first application function network element and the terminal device after receiving the response message for the first application session establishment request message, the terminal device sends the second application session establishment request message to the first application server, where the communication key between the first application function network element and the terminal device is derived from the first key.

In a possible design, the terminal device deletes a first application session context, or the terminal device indicates the first application function network element to delete a first application session context.

According to a fifth aspect, this application provides a key management method. The method includes: An authentication and key management for applications AKMA anchor function network element receives a first request message from a first application function network element after a procedure of re-authentication, where the first request message is for requesting a communication key between a terminal device and the first application function network element, the first request message carries identification information of a first key, and the first key is an AKMA key generated before the procedure of the re-authentication. The AKMA anchor function network element cannot determine an authentication server function network element corresponding to the identification information of the first key. The AKMA anchor function network element sends a response message for the first request message to the first application function network element, where the response message for the first request message indicates a request failure in the communication key between the terminal device and the first application function network element.

In the method, after re-authentication occurs, if the authentication server function network element corresponding to the identification information of the first key cannot be determined, the AKMA anchor function network element indicates that the first application function network element cannot determine the authentication server function network element, so that the first application function network element indicates a first application session establishment failure to the terminal device, and the terminal device can re-initiate an application session establishment procedure. Therefore, it is ensured that the terminal device and the application function network element successfully agree on the communication key between the terminal device and the application function network element, to implement secure communication between the terminal device and the application function network element.

In a possible design, the AKMA anchor function network element sends an authentication server function network element path information request message to a data management network element, where the authentication server function network element path information request message carries the identification information of the first key. The AKMA anchor function network element receives a response message for the authentication server function network element path information request message from the data management network element, where the response message for the authentication server function network element path information request message indicates an authentication server function network element path information request failure.

In a possible design, the AKMA anchor function network element sends a first failure cause value to the first application function network element, where the first failure cause value indicates that the authentication server function network element cannot be found.

According to a sixth aspect, this application provides a key management method. The method includes: An authentication server function network element receives a second authentication request in a procedure of re-authentication. The authentication server function network element sends a response message for the second authentication request in the procedure of the re-authentication.

The authentication server function network element receives a first key request message from an authentication and key management for applications AKMA anchor function network element, where the first key request message carries identification information of a first key, and the first key is an AKMA key generated by the authentication server function network element before the procedure of the re-authentication.

The authentication server function network element cannot determine the first key corresponding to the identification information of the first key.

The authentication server function network element sends a response message for the first key request message to the AKMA anchor function network element, where the response message for the first key request message indicates a first key request failure.

In the method, after re-authentication occurs, if the first key corresponding to the identification information of the first key cannot be determined, the authentication server function network element indicates to the AKMA anchor function network element that the first key cannot be determined, so that the AKMA anchor function network element indicates a request failure in a communication key between a terminal device and an application function network element to the application function network element, and the application function network element indicates a first application session establishment failure to the terminal device.

In this way, the terminal device can re-initiate an application session establishment procedure. Therefore, it is ensured that the terminal device and the application function network element successfully agree on the communication key between the terminal device and the application function network element, to implement secure communication between the terminal device and the application function network element.

In a possible design, the authentication server function network element sends a second failure cause value to the AKMA anchor function network element, where the second failure cause value indicates that the first key corresponding to the identification information of the first key cannot be determined.

According to a seventh aspect, this application provides a terminal device. The terminal device has a function of implementing the method in the first aspect or the fourth aspect. The function may be implemented by hardware, or may be implemented by hardware executing corresponding software. The hardware and the software include one or more modules corresponding to the function.

In a possible design, a structure of the terminal device includes a processor and a transceiver. The processor is configured to support the terminal device in performing the method in the first aspect or the fourth aspect. The transceiver is configured to support communication between the terminal device and another device. The terminal device may further include a memory. The memory is configured to be coupled to the processor, and stores program instructions and data that are necessary for the terminal device.

According to an eighth aspect, this application provides an authentication server function network element. The authentication server function network element has a function of implementing the method in the second aspect or the sixth aspect. The function may be implemented by hardware, or may be implemented by hardware executing corresponding software. The hardware and the software include one or more modules corresponding to the function.

With reference to the eighth aspect, in a possible design, a structure of the authentication server function network element includes a processor and a transceiver. The processor is configured to support the authentication server function network element in performing the method in the second aspect or the sixth aspect. The transceiver is configured to support communication between the authentication server function network element and another device. The authentication server function network element may further include a memory. The memory is configured to be coupled to the processor, and stores program instructions and data that are necessary for the authentication server function network element.

According to a ninth aspect, this application provides an authentication and key management for applications AKMA anchor function network element. The AKMA anchor function network element has a function of implementing the method in the third aspect or the fifth aspect. The function may be implemented by hardware, or may be implemented by hardware executing corresponding software. The hardware and the software include one or more modules corresponding to the function.

With reference to the ninth aspect, in a possible design, a structure of the AKMA anchor function network element includes a processor and a transceiver. The processor is configured to support the AKMA anchor function network element in performing the method in the third aspect or the fifth aspect. The transceiver is configured to support communication between the AKMA anchor function network element and another device. The AKMA anchor function network element may further include a memory. The memory is configured to be coupled to the processor, and stores program instructions and data that are necessary for the AKMA anchor function network element.

According to a tenth aspect, this application provides an apparatus (for example, the apparatus may be a chip system). The apparatus includes a processor, and may perform any one or more methods in the first aspect to the sixth aspect.

With reference to the tenth aspect, in a possible design, the apparatus further includes a memory, configured to store necessary program instructions and data.

According to an eleventh aspect, this application provides a computer program product. When the computer program product runs on a computer, the computer is enabled to perform any one or more methods in the first aspect to the sixth aspect.

According to a twelfth aspect, this application provides a computer-readable storage medium. The computer-readable storage medium stores instructions. When the instructions are run on a computer, the computer is enabled to perform any one or more methods in the first aspect to the sixth aspect.

According to a thirteenth aspect, this application provides a communication system. The system includes the authentication server function network element in the second aspect and the authentication and key management for applications AKMA anchor function network element in the second aspect.

With reference to the thirteenth aspect, in a possible design, the system further includes another device such as the application function network element in the second aspect.

DESCRIPTION OF EMBODIMENTS

The following describes the technical solutions in embodiments of this application with reference to the accompanying drawings in embodiments of this application.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a 5th generation (5th generation, 5G) system, or a new radio (new radio, NR) system.

Figure 1:
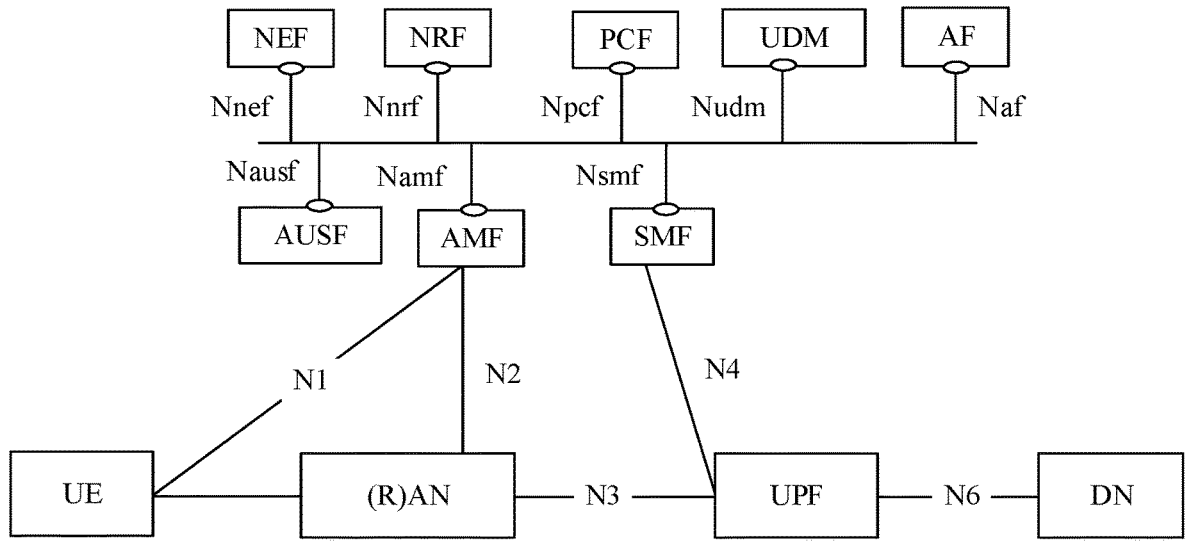
FIG. 1 is a schematic diagram of a network architecture of a 5G system.

FIG. 1 is a schematic diagram of a network architecture of a 5G system. The 5G system may include a terminal device, an access network, and a core network.

The terminal device is a device having a wireless transceiver function, and may be deployed on the land, including an indoor or outdoor device, a hand-held device, a wearable device, or a vehicle-mounted device, or may be deployed on the water (for example, on a ship), or may be deployed in the air (for example, on a plane, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. The terminal device sometimes may also be referred to as a terminal, user equipment (user equipment, UE), an access terminal device, a vehicle-mounted terminal, an industrial control terminal, a UE unit, a UE station, a mobile station, a remote station, a remote terminal device, a mobile device, a UE agent, a UE apparatus, or the like. The terminal device may alternatively be fixed or mobile. In FIG. 1 and this application, an example in which the terminal device is UE is used for description.

The access network is configured to implement an access-related function, and may provide a network access function for an authorized user in a specific area. The access network forwards a control signal and user data between the terminal device and the core network. The access network may include an access network device. The access network device may be a device that provides access for the terminal device and may include a radio access network (radio access network, RAN) device and an AN device. The RAN device is mainly a wireless network device in a 3GPP network, and the AN device may be an access network device defined in non-3GPP. In systems using different radio access technologies, a device having a base station function may have different names. For example, in a 5G system, the device is referred to as a RAN or a next-generation NodeB (next-generation Node base station, gNB). In an LTE system, the device is referred to as an evolved NodeB (evolved NodeB, eNB or eNodeB).

The core network is responsible for maintaining subscription data of a mobile network, and providing functions such as session management, mobility management, policy management, and security authentication for the UE. The core network may include the following network elements: a user plane function (user plane function, UPF), an authentication server function (authentication server function, AUSF), an access and mobility management function (access and mobility management function, AMF), a session management function (session management function, SMF), a network exposure function (network exposure function, NEF), a network repository function (network function repository function, NRF), a policy control function (policy control function, PCF), a unified data management (unified data management, UDM), and an application function (application function, AF).

The AMF is mainly responsible for mobility management in the mobile network, such as user location update, registration of a user with a network, and user switching. The SMF is mainly responsible for session management in the mobile network, such as session establishment, modification, and release. The UPF is responsible for forwarding and receiving user data in the terminal device, may receive user data from a data network, and transmit the user data to the terminal device through the access network device; and may further receive user data from the terminal device through the access network device, and forward the user data to the data network. The PCF mainly supports providing a unified policy framework to control network behavior, and providing a policy rule for a control layer network function, and is also responsible for obtaining policy-decision-related subscription information of a user. The AUSF is configured to perform UE security authentication. The NEF is mainly configured to support capability and event exposure. The NRF is configured to store and select network function entity information for another network element. The UDM is configured to store user data, for example, subscription data and authentication/authorization data. The AF interacts with a 3GPP core network to provide an application layer service, for example, provide application layer data routing, provide an access network capability exposure function, interact with a policy framework to provide policy control, and interact with an IP multimedia subsystem (IP multimedia subsystem, IMS) in a 5G network.

The data network (data network, DN) is configured to provide a service for the user. The data network may be a private network, for example, a local area network. The data network may alternatively be an external network that is not controlled by an operator, for example, the Internet (Internet). The data network may alternatively be a dedicated network jointly deployed by operators, for example, a network in the IMS. The terminal device may access the DN through an established protocol data unit (protocol data unit, PDU) session.

The technical solutions in embodiments of this application relate to an AKMA (authentication and key management for applications) service. When UE that supports the AKMA service performs data transmission with an AF that supports the AKMA service, security protection based on an AKMA procedure can be performed to improve data transmission security. In comparison with a conventional unprotected transmission method for UE and an AF, using AKMA can improve data transmission security.

Figure 2:
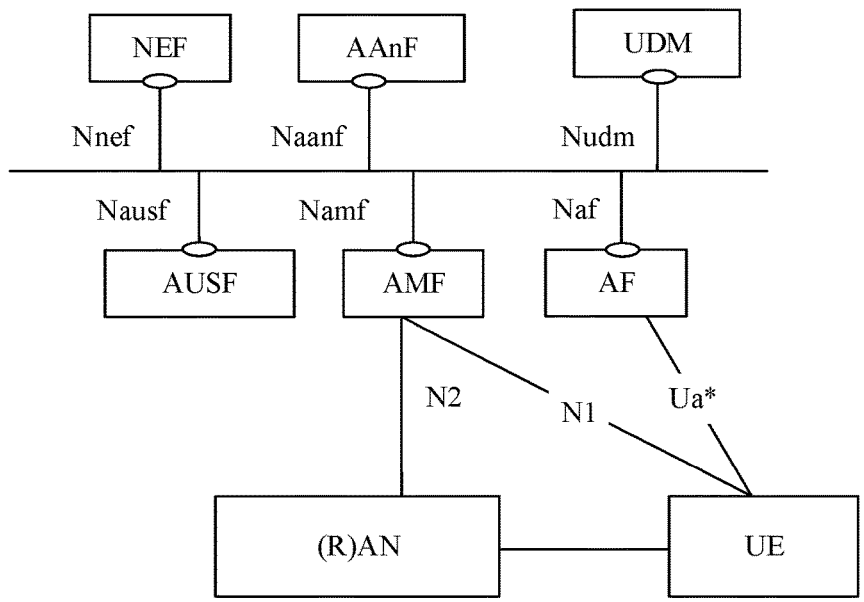
FIG. 2 is a schematic diagram of an AKMA architecture.

Based on the network architecture of the 5G system, an AKMA architecture defines network elements used in the AKMA procedure. FIG. 2 is a schematic diagram of an AKMA architecture. The AKMA architecture includes UE, a (R)AN, an AUSF, an AMF, an AF, a NEF, an AKMA anchor function (AKMA anchor function, AAnF), and a UDM.

In FIG. 2, there are three manners in which the UE communicates with the AF. One manner is that the UE communicates with the AF through the (R)AN and the AMF, one manner is that the UE communicates with the AF through the AMF, and one manner is that the UE directly communicates with the AF through a Ua* interface. The Ua* interface is a communication interface between the UE and the AF.

The UE may generate an AKMA key and AKMA key identification information, and initiate an application session establishment request message to the AF, where the application session request message carries the AKMA key identification information. The AF may request a communication key between the AF and the UE from the AAnF by using the AKMA key identification information. The AAnF may request an AKMA key from the AUSF, and generate the communication key between the AF and the UE and validity time of the communication key based on the AKMA key. The AUSF may generate the AKMA key. The AKMA key may be, for example, Kakma, and Kakma may also be referred to as a root key of AKMA. The AKMA key identification information may be any information for identifying the AKMA key, for example, may be an A-KID (AKMA-Key identifier) or a Kakma ID (Kakma identifier). The communication key between the AF and the UE may be, for example, Kaf. The AF performs data transmission with the UE by using Kaf, so that security of data transmission between the AF and the UE can be improved.

Figure 3:
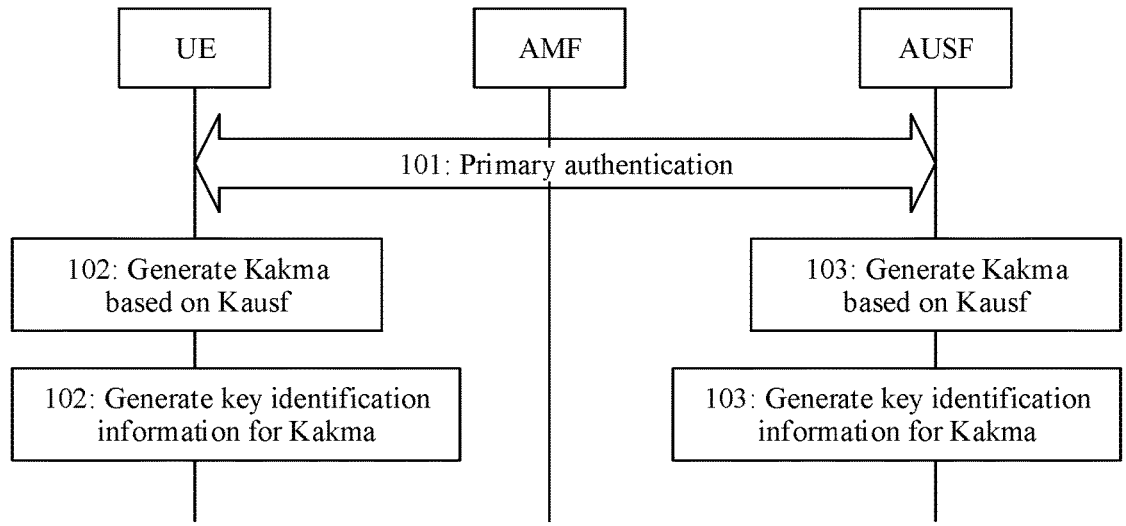
FIG. 3 is a schematic flowchart of generating an AKMA key.

For example, for a process in which the AUSF and the UE generate the AKMA key (using Kakma as an example), refer to FIG. 3. The process specifically includes the following steps.

Step 101: The UE and the AUSF perform a primary authentication (Primary Authentication) procedure.

Primary authentication is a process in which the UE performs authentication on an AMF and/or the AUSF and the AUSF performs authentication on the UE in a process in which the UE registers with a 5G core network. The primary authentication may also be described as bidirectional authentication. For details, refer to a procedure shown in FIG. 4. Specifically, in a registration process, a core network device may exchange a message with the terminal. The terminal compares a to-be-verified parameter provided by the core network device with another parameter generated by the terminal, and the core network device compares a to-be-verified parameter provided by the terminal with another parameter generated by the core network device. If the to-be-verified parameter provided by the core network device is the same as the parameter generated by the terminal, or if the to-be-verified parameter provided by the terminal is the same as the parameter generated by the core network device, authentication verification performed between the terminal and the core network device succeeds.

Step 102: The UE generates Kakma and AKMA key identification information (using an A-KID as an example) by using an intermediate key (using Kausf as an example) generated in the primary authentication procedure.

After performing authentication on the AMF and/or the AUSF and before initiating an application session establishment request, the UE generates Kakma and the AKMA key identification information such as the A-KID by using the intermediate key such as Kausf generated in the primary authentication procedure.

Step 103: The AUSF generates Kakma and the A-KID by using Kausf.

After the AUSF performs authentication on the UE, the AUSF may generate Kakma and the A-KID by using Kausf.

Figure 5:
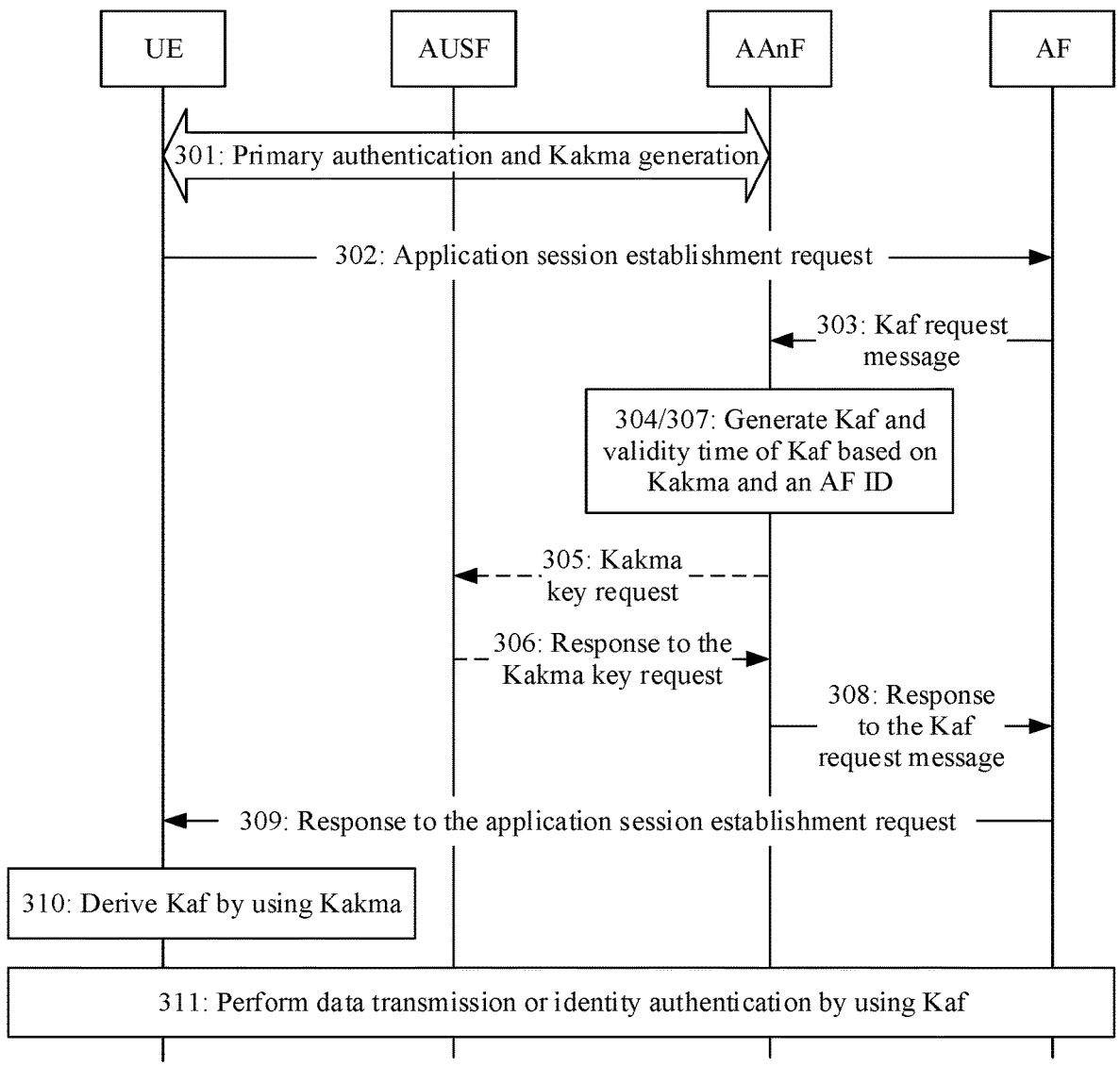
FIG. 5 is a schematic diagram of an AKMA procedure.

It should be noted that the AUSF may directly generate Kakma and the A-KID after the primary authentication procedure, or may generate Kakma and the A-KID when an AAnF requests Kakma from the AUSF in FIG. 5, or may respectively generate Kakma and the A-KID at different moments. This is not limited in this application.

It may be understood that the UE and the AUSF separately locally generate the same Kausf, the same Kakma, and the same A-KID.

It should be noted that there is no time sequence relationship between step 102 and step 103. Step 102 may be performed before step 103, step 103 may be performed before step 102, or step 102 and step 103 may be simultaneously performed. This is not limited in this application.

Figure 4:
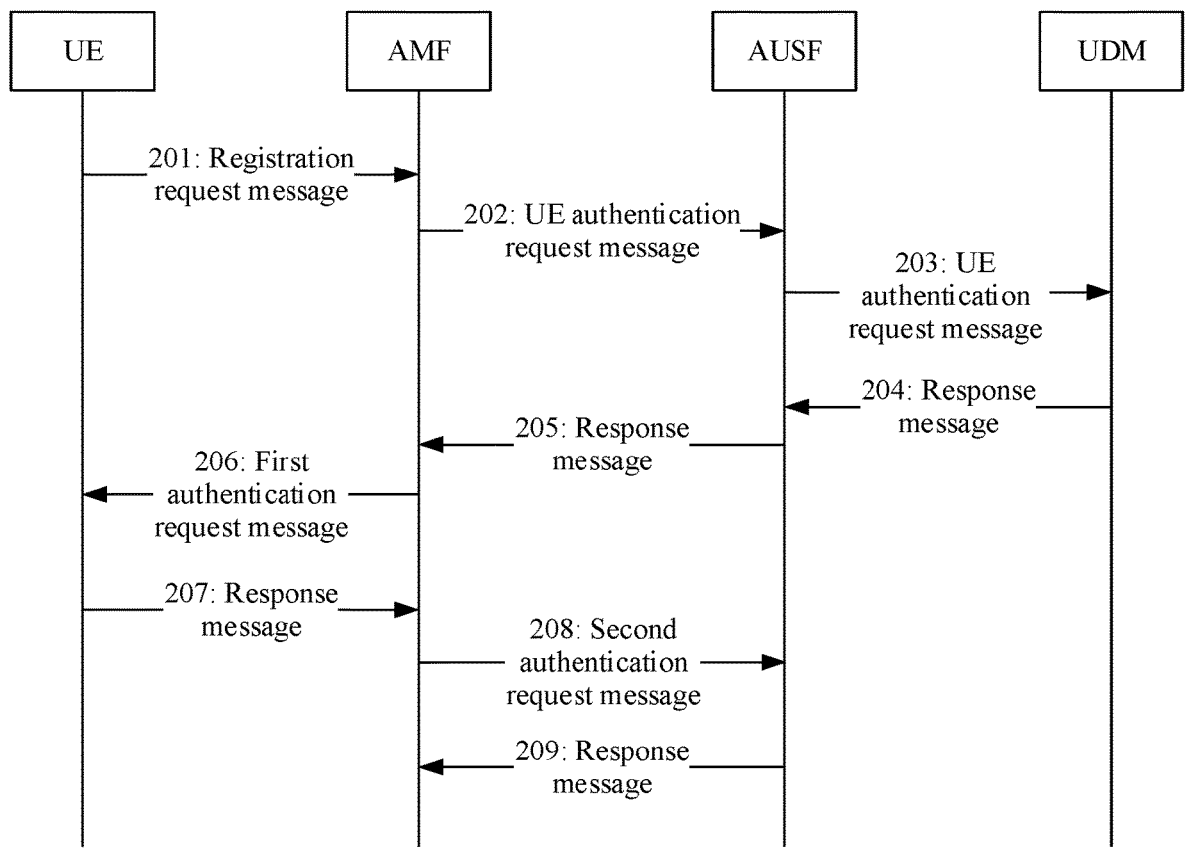
FIG. 4 is a schematic flowchart of triggering and performing primary authentication.

For example, for a procedure of triggering and performing primary authentication, refer to FIG. 4. The procedure specifically includes the following steps.

Step 201: UE sends a registration request (Registration Request) to an AMF through a RAN.

The registration request carries identity information of the UE, and the AMF selects an AUSF based on the identity information (for example, a subscription concealed identifier (subscriber concealed identifier, SUCI)) of the UE.

In an authentication scenario, the AMF may be referred to as a security anchor function (Security Anchor Function, SEAF) network element. Each AMF in embodiments of this application may be replaced with an SEAF.

Step 202: The AMF sends a UE authentication request message (UEAuthentication_Authenticate Request message) to the AUSF.

The UE authentication request message carries the identity information of the UE.

Step 203: The AUSF sends a UE authentication obtaining request (UEAuthentication_Get Request) message to a UDM, to trigger a primary authentication procedure.

The UE authentication obtaining request message carries the identity information of the UE. If the identity information is the SUCI, the UDM parses the SUCI to obtain a permanent identity of the UE and searches for a root key of the UE.

Step 204: The UDM sends a response message (Authentication_Get response) for the UE authentication obtaining request message to the AUSF.

Step 205: The AUSF sends a response message (UEAuthentication_Authenticate Response) for the UE authentication request message to the AMF. The response message for the UE authentication request message carries an authentication parameter of the AMF.

Step 206: The AMF sends a first authentication request (Authentication-Request) message to the UE. The first authentication request message carries an authentication parameter of the AMF.

Step 207: The UE calculates an authentication parameter by using the locally stored root key, and checks the authentication parameter of the AMF. If the check succeeds, it indicates that a core network is credible. After the check succeeds, the UE sends a response message (Authentication Response) for the first authentication request message to the AMF, where the response message for the first authentication request message carries the authentication parameter of the UE. The AMF determines, based on the authentication parameter of the UE, that the AMF does not spoof the AUSF during authentication.

Step 208: The AMF sends a second authentication request message (UEAuthentication_Authenticate Request message) to the AUSF, where the second authentication request message carries an authentication parameter of the UE, and the AUSF checks the authentication parameter of the UE. If the check succeeds, it indicates that authentication succeeds.

Step 209: The AUSF performs authentication on the UE based on the authentication parameter of the UE, and sends a response message (UEAuthentication_Authenticate Response) for the second authentication request message to the AMF, to notify the AMF of a result of the authentication performed by the AUSF on the UE.

In the foregoing primary authentication procedure, the AUSF and the UE generate Kausf that may be used by the AUSF and the UE to generate Kakma. For details, refer to the process shown in FIG. 3.

It should be noted that the primary authentication procedure (that is, steps 204 to 209) is brief descriptions of a primary authentication procedure in a 5G network in a conventional technology. For specific details about the primary authentication procedure in the 5G network, refer to a 5G AKA (authentication and key agreement) procedure or an EAP-AKA' (Extensible Authentication Protocol—Authentication and Key Agreement) procedure. For specific details of a primary authentication procedure in an LTE network, refer to an EPS (evolved packet system) AKA procedure. Details are not described in this application.

For example, for an AKMA procedure, refer to FIG. 5. The procedure specifically includes the following steps.

Step 301: UE and an AUSF perform primary authentication, and separately generate Kakma and an A-KID corresponding to Kakma.

For a primary authentication procedure and generation of Kakma and the A-KID, refer to the descriptions in FIG. 3 and FIG. 4. Details are not described herein again.

After the UE generates Kakma and the A-KID, an AAnF may store Kakma and the A-KID.

Step 302: The UE sends an application session establishment request (for example, an application session establishment request) to an AF.

The application session establishment request carries the A-KID.

Step 303: After receiving the application session establishment request, the AF sends a Kaf request message (for example, a key request) to the AAnF.

The Kaf request message carries the A-KID and identification information of an application service function network element, and the identification information of the application service function network element may be, for example, an AF ID.

Step 304: If the AAnF stores Kakma corresponding to the A-KID, the AAnF directly generates Kaf and validity time of Kaf based on Kakma and the AF ID, and steps 307 to 311 are performed.

If the AAnF does not store Kakma corresponding to the A-KID, steps 305 to 311 are performed.

Step 305: The AAnF sends a Kakma key request (for example, an AKMA key request) to the AUSF.

The Kakma key request carries the A-KID.

Step 306: The AUSF searches for corresponding Kakma based on the A-KID, and sends a response message (for example, an AKMA key response) for the Kakma key request to the AAnF.

The response message for the Kakma key request carries Kakma.

Step 307: The AAnF derives Kaf by using Kakma, and further, the AAnF further generates the validity time of Kaf.

Step 308: The AAnF sends a response message (for example, a key response) for the Kaf request message to the AF.

The response message for the Kaf request message carries Kaf and the validity time of Kaf.

Step 309: After receiving the response message for the Kaf request message, the AF sends a response message (for example, an application session establishment response) for the application session establishment request to the UE.

Step 310: After receiving the response message for the application session establishment request, the UE may derive Kaf by using Kakma.

It should be noted that the UE may derive Kaf after receiving the response message for the application session establishment request, after sending the application session establishment request, or before sending the application session establishment request. This is not limited in this application.

Kaf between different AFs and same UE may be different. For example, Kaf between an AF 1 and UE 1 is Kaf 1, and Kaf between an AF 2 and the UE 1 is Kaf 2.

Step 311: Kaf is used to perform data transmission or identity authentication between the UE and the AF, to improve security of data transmission between the AF and the UE.

The technical solutions in embodiments of this application further relate to re-authentication. To be specific, the UE performs re-authentication on a core network device (for example, the AMF and/or the AUSF in 5G), and the core network device (for example, the AUSF in 5G) performs re-authentication on the UE. Specifically, the core network device (for example, the AMF in 5G) may find that a parameter is about to be unavailable, to trigger re-authentication on the UE. For example, that the parameter is about to be unavailable may be that a NAS (non-access stratum) COUNT is about to wrap around, or a trigger condition for the core network device (for example, the AMF in 5G) to re-authenticate the UE is met based on a configuration requirement of an operator. In a process in which the core network device performs re-authentication on the terminal, the core network device exchanges a message with the terminal. The terminal compares a to-be-verified parameter provided by the core network device with another parameter generated by the terminal, and the core network device compares a to-be-verified parameter provided by the terminal with another parameter generated by the core network device. If the to-be-verified parameter provided by the core network device is the same as the parameter generated by the terminal, or if the to-be-verified parameter provided by the terminal is the same as the parameter generated by the core network device, authentication verification performed between the terminal and the core network device succeeds.

For specific steps of the 5G re-authentication procedure, refer to steps 202 to 209 shown in FIG. 4. It may be understood that re-authentication is a process in which the core network device initiates primary authentication on the UE again after primary authentication occurs. In this application, re-authentication is initiated by the core network device, and primary authentication in a UE registration process is initiated by the core network device after the UE sends a registration request to the core network device. After the re-authentication, the UE and the AUSF generate new Kausf, and previous Kausf is deleted. Correspondingly, after the re-authentication, previous Kakma and a previous A-KID are deleted. When the UE needs to initiate a new application session establishment request message, new Kakma and a new A-KID are generated.

In the AKMA procedure, lifetime of Kakma may be the same as an interval at which the UE performs primary authentication again. For example, the UE performs primary authentication for the first time and generates Kakma. In this case, Kakma is stored until the re-authentication occurs. Occurrence of the re-authentication cannot be clearly determined. Therefore, storage time of Kakma cannot be determined. Kaf has clear validity time. As a result, expiration time of Kakma and expiration time of Kaf are decoupled and cannot affect each other.

A current AKMA procedure does not consider occurrence of the re-authentication. Consequently, a problem caused by the generation of new Kakma and the new A-KID during the re-authentication is not considered.

Specifically, in the 5G network, there is a scenario in which the UE may access a 5G core network by using a 3GPP access technology. In this scenario, the UE exchanges a control plane message and a user plane message with the 5G core network. An AKMA service is a user plane service, and primary authentication and re-authentication are control plane procedures. After the UE is in a connected state, the core network initiates a procedure of the re-authentication on the UE when the AKMA service may be performed between the UE and the core network. Kakma stored on a UE side and Kakma stored on an AUSF side, or Kaf generated on the UE side and Kaf generated by the AAnF may be out of synchronization. Out-of-synchronization indicates that Kakma stored on the UE side is different from Kakma stored on the AUSF side, or Kaf generated by the UE is different from Kaf obtained by the AF.

In the 5G network, there is also a scenario in which the UE may multi-access a 5G core network by using a 3GPP access technology and a non-3GPP access technology simultaneously. In this scenario, when the UE may simultaneously use access technologies, there are the following scenarios: 1. The UE exchanges a control plane NAS message with the 5G core network by using one access technology, and the UE transmits user plane data by using the other access technology. 2. The UE simultaneously uses technologies to transmit user plane data corresponding to different DNs. 3. The UE simultaneously uses access technologies to exchange a control plane NAS message with the 5G core network. Similarly, because an AKMA service is a user plane service, and primary authentication and re-authentication are control plane procedures, in the scenario 1, the core network may initiate a procedure of the re-authentication on the UE when the UE initiates the AKMA service. Kakma stored on a UE side and Kakma stored on an AUSF side, or Kaf generated on the UE side and Kaf generated by the AAnF may be out of synchronization.

For the foregoing out-of-synchronization of Kaf generated on the UE side and Kaf generated by the AAnF, embodiments of this application provide the following specific scenarios:

Scenario 1: The UE side generates new Kakma (denoted as Kakma-2), and generates Kaf-2 by using new Kakma, but the AAnF generates Kaf-1 by using previous Kakma (denoted as Kakma-1).

For example, when the AAnF does not store Kakma-1 corresponding to an A-KID-1, the UE sends an application session establishment request message. After the AAnF requests Kakma-1 from the AUSF. (after the AAnF obtains Kakma-1), re-authentication occurs, the AAnF generates Kaf-1 by using Kakma-1, and the UE generates Kaf-2 by using new Kakma after sending the application session establishment request message.

Alternatively, when the AAnF stores Kakma-1 corresponding to an A-KID-1, the UE sends an application session establishment request message, re-authentication occurs after the AAnF directly generates Kaf-1, and the UE generates Kaf-2 by using new Kakma after receiving the application session establishment request message.

Scenario 2: The UE side generates Kaf-1 by using Kakma-1, but the AAnF cannot find Kakma-1 by using an A-KID-1.

For example, when the AAnF does not store Kakma-1 corresponding to the A-KID-1, after the UE sends an application session establishment request message, re-authentication occurs before the AAnF requests Kakma-1 from the AUSF, Kakma-1 is deleted from the AUSF, the AAnF cannot find Kakma-1 by using the A-KID-1, and the UE may generate Kaf-1 before the re-authentication after sending the application session establishment request message.

Alternatively, when the AAnF stores Kakma-1 corresponding to the A-KID-1, after the UE sends an application session establishment request message, re-authentication occurs before the AAnF generates Kaf-1, Kakma-1 is deleted from the AAnF, and the UE may generate Kaf-1 before the re-authentication after sending the application session establishment request message.

Scenario 3: The UE side generates Kaf-1 by using Kakma-1, but the AAnF generates Kaf-2 by using Kakma-2.

For example, when the AAnF does not store Kakma-1 corresponding to an A-KID-1, after the UE sends an application session establishment request message, re-authentication occurs before the AAnF requests Kakma-1 from the AUSF. The AUSF still stores the A-KID-1 but generates Kakma-2. The AUSF mistakenly considers that the A-KID-1 corresponds to Kakma-2, and correspondingly returns Kakma-2 to the AAnF.

This extreme case may occur when the UE requests an AKMA service of an AF for the first time, but unfortunately, re-authentication occurs.

Figure 6:
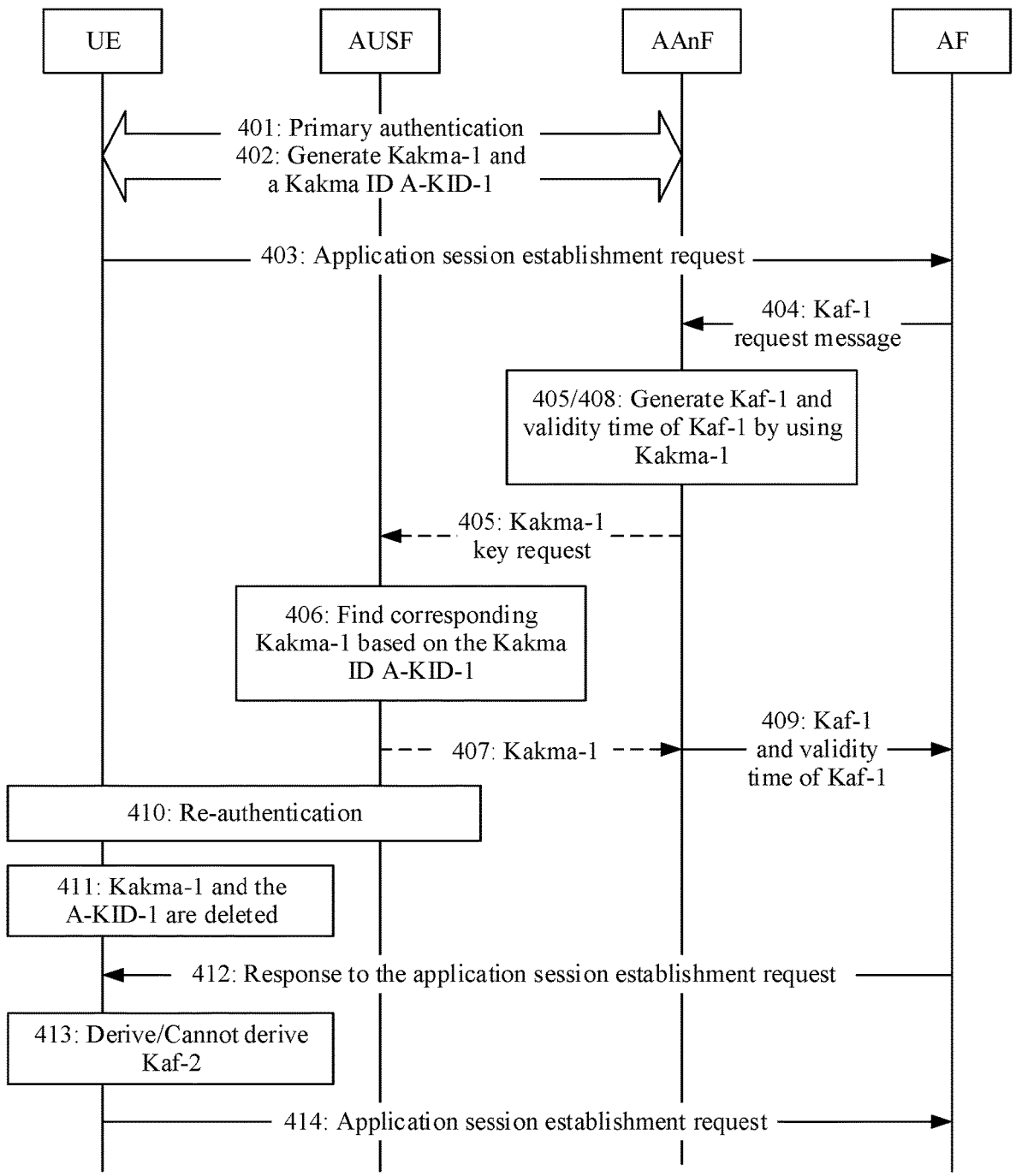
FIG. 6 is a schematic diagram of re-authentication occurring in an AKMA procedure in a scenario 1.

FIG. 6 shows a procedure of re-authentication in an AKMA procedure in the scenario 1. The procedure specifically includes the following steps.

Step 401: UE and an AUSF perform a primary authentication procedure.

The UE and the AUSF perform the primary authentication procedure. For details, refer to detailed descriptions of the primary authentication procedure in FIG. 3 and FIG. 4. Details are not described herein again.

Step 402: The UE generates Kakma-1 and an A-KID-1.

The A-KID-1 identifies key identification information generated for Kakma-1 before re-authentication. After the primary authentication procedure, the UE uses Kausf generated during the primary authentication procedure to generate Kakma-1 and generates the A-KID-1 for Kakma-1.

An A-KID generated by the UE is unique, that is, the A-KID is globally unique. One A-KID uniquely identifies one Kakma, and different Kakma corresponds to different A-KIDs.

Step 403: The UE initiates an application session request to an AF, which can be numbered as AF 1, where the A-KID-1 is carried in the application session request.

The AF 1 identifies an application function network element to which the UE requests to establish an application session before the re-authentication. The application session request is, for example, an application session establishment request.

Step 404: After receiving the application session request, the AF 1 requests Kaf-1 from an AAnF.

For a service-based interface, a request message used by the AF 1 to request Kaf from the AAnF is a service-based message. A name of the request message is a service-based message name, and may be specifically a key request. The request message carries the A-KID-1 and an identifier of an AF, and the identifier of the AF may be, for example, an AF ID (identifier).

Step 405: If the AAnF stores Kakma-1 corresponding to the A-KID-1, the AAnF directly generates Kaf-1 and validity time of Kaf-1, and steps 409 to 414 are performed. If the AAnF does not store Kakma-1 corresponding to the A-KID-1, the AAnF requests Kakma-1 from the AUSF, and steps 406 to 414 are performed.

For a service-based interface, the request message used by the AAnF to request Kakma-1 from the AUSF is a service-based message. A name of the request message is a service-based message name, and may be specifically an AKMA key request. The request message carries the A-KID-1.

Step 406: The AUSF finds corresponding Kakma-1 based on the A-KID-1.

Step 407: The AUSF sends Kakma-1 to the AAnF.

Specifically, Kakma-1 may be carried in an AKMA key response message and sent to the AAnF.

Step 408: The AAnF generates Kaf-1 and the validity time of Kaf-1 by using Kakma-1.

Step 409: The AAnF sends generated Kaf-1 and the generated validity time of Kaf-1 to the AF 1.

Specifically, Kaf-1 and the validity time of the Kaf-1 may be carried in a key response message and sent to the AF 1.

Step 410: Re-authentication occurs between the UE and the AUSF.

Step 411: After the re-authentication, Kakma-1 and the A-KID-1 on a UE side are deleted. If the re-authentication succeeds, the UE side generates Kakma-2.

Step 412: After receiving Kaf-1 and the validity time of Kaf-1, the AF 1 sends an application session establishment response to the UE. The application session establishment response is, for example, an application session establishment response.

Step 413: The UE receives the application session establishment response. If a key on the UE side is Kakma-2, the UE derives that an AF key is Kaf-2, and Kaf out-of-synchronization between the UE side and an AF side is caused. If Kakma on the UE side is deleted, the UE side cannot derive Kaf.

Step 414: Optionally, the UE initiates an application session establishment agreement process to an AF 2, where an A-KID-2 is included by the UE in an application session request message sent to the AF 2. The AF 2 can be the same as or different from the AF 1.

Figure 7:
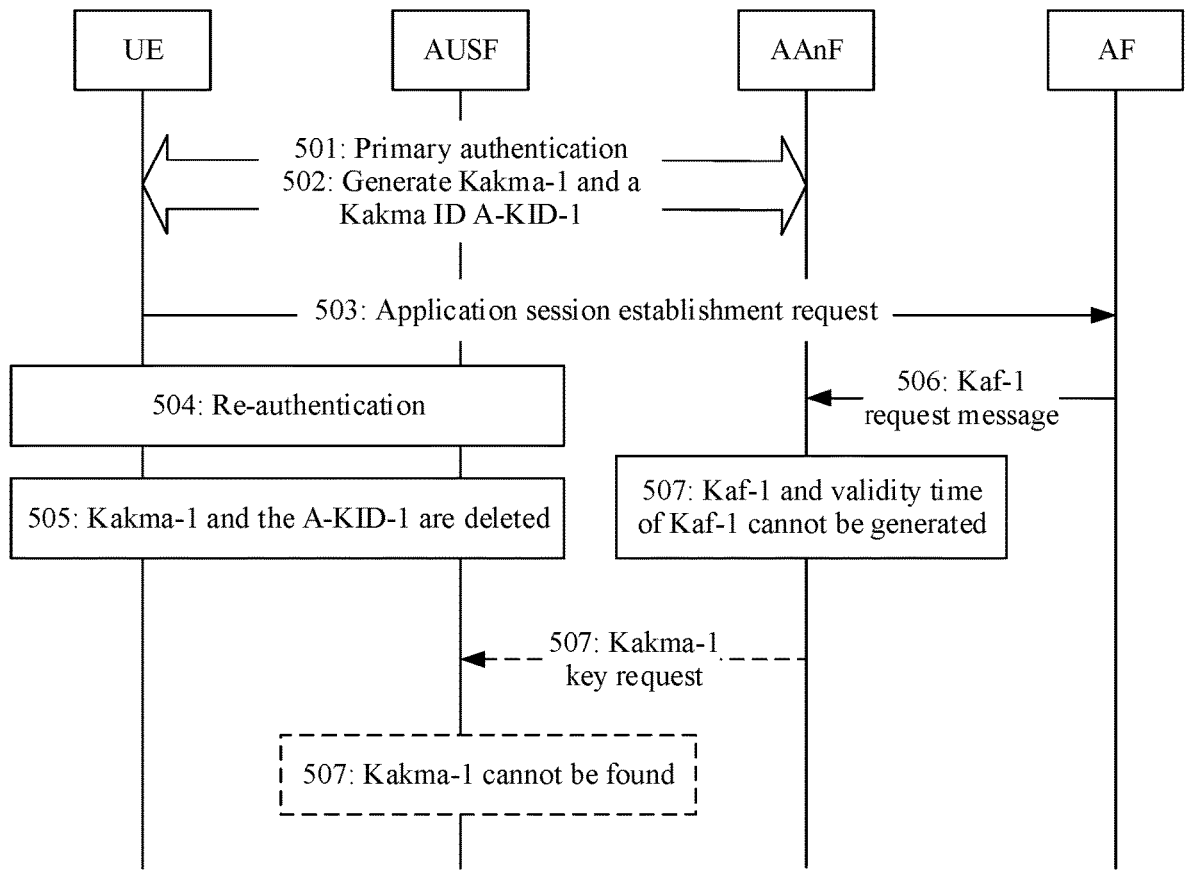
FIG. 7 is a schematic diagram of re-authentication occurring in an AKMA procedure in a scenario 2.

FIG. 7 shows a procedure of re-authentication in an AKMA procedure in the scenario 2. The procedure specifically includes the following steps.

Step 501: UE and an AUSF perform a primary authentication procedure.

The UE and the AUSF perform the primary authentication procedure. For details, refer to detailed descriptions of the primary authentication procedure in FIG. 3 and FIG. 4. Details are not described herein again.

Step 502: The UE generates Kakma-1 and an A-KID-1.

An A-KID generated by the UE is unique, that is, the A-KID is globally unique. One A-KID uniquely identifies one Kakma, and different Kakma corresponds to different A-KIDs.

Step 503: The UE initiates an application session request to an AF, which can be numbered as AF 1, where the A-KID-1 is carried in the application session request.

The application session request is, for example, an application session establishment request.

Step 504: Re-authentication occurs between the UE and the AUSF.

Step 505: After the re-authentication, Kakma-1 and the A-KID-1 on a UE side and an AUSF side are deleted. If the re-authentication succeeds, the UE side and the AUSF side generate Kakma-2.

If an AAnF stores Kakma-1 and the A-KID-1 before the re-authentication, Kakma-1 and the A-KID-1 are deleted from the AAnF after the re-authentication. If the re-authentication succeeds, the AAnF obtains Kakma-2 and an A-KID-2.

Step 506: After receiving the application session request, the AF 1 requests Kaf-1 from the AAnF.

For a service-based interface, a request message used by the AF 1 to request Kaf-1 from the AAnF is a service-based message. A name of the request message is a service-based message name, and may be specifically a key request. The request message carries the A-KID-1 and an identifier of the AF.

Step 507: If the AAnF stores Kakma-1 and the A-KID-1 before the re-authentication, because Kakma-1 and the A-KID-1 are deleted from the AAnF after the re-authentication, the AAnF cannot find Kakma-1 based on the A-KID-1, and Kaf on an AF side cannot be generated.

If the AAnF does not store Kakma-1 and the A-KID-1 when receiving, from the AF 1, the request message for requesting Kaf-1, the AAnF requests Kakma-1 from the AUSF. For a service-based interface, the request message used by the AAnF to request Kakma-1 from the AUSF is a service-based message. A name of the request message is a service-based message name, and may be specifically an AKMA key request. The request message carries the A-KID-1. Because Kakma-1 and the A-KID-1 are deleted from the AUSF after the re-authentication, the AUSF cannot find Kakma-1 based on the A-KID-1, and Kaf on the AF side cannot be generated.

In an implementation, the AAnF searches for routing information of the AUSF by accessing a UDM, and required identification information is the A-KID-1. Because information related to the A-KID-1 is deleted from the UDM after the re-authentication, the UDM cannot find the routing information of the AUSF based on the A-KID-1, and Kaf on the AF side cannot be generated.

It can be learned from the foregoing procedure shown in FIG. 6 or FIG. 7 that the UE initiates an application connection establishment procedure to the AF when the UE needs to establish application communication with the AF. Before a Kaf key agreement between the UE side and the AF side is completed, re-authentication occurs between the UE and the core network. As a result, Kakma generated before the re-authentication is deleted, and Kaf generated by the UE and Kaf obtained by the AF are out of synchronization, or the AF fails to request the AF key from the AAnF. In a re-authentication scenario, how to ensure that the UE and the AF side successfully agree on the AF key to implement secure communication between the UE and the AF is an urgent technical problem to be resolved.

In view of this, this application provides a key management method, a device, and a system, to ensure that a terminal device and an application function network element successfully agree on a communication key between the terminal device and the application function network element, to implement secure communication between the terminal device and the application function network element.

Figure 8:
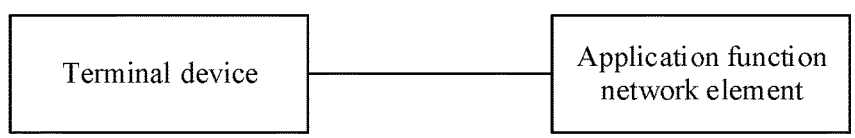
FIG. 8 is a schematic architectural diagram of a key management system according to this application.

FIG. 8 is a schematic architectural diagram of a key management system according to this application. The system includes at least one terminal device and at least one application function network element. For descriptions of the terminal device, refer to the specific descriptions of the terminal device in the foregoing 5G system. The application function network element may be an AF in the 5G system, or may be a network element configured to implement all or some functions of the AF in a future communication system.

In a possible implementation, the terminal device is configured to: send a first application session establishment request message to the application function network element, where the first application session establishment request message carries identification information of a first key, and the first key is an authentication and key management for applications AKMA key; receive a first authentication request message in a procedure of re-authentication; send a response message for the first authentication request message in the procedure of the re-authentication; receive a response message for the first application session establishment request message from the application function network element; and derive a communication key between the terminal device and the application function network element by using the first key.

The application function network element receives the first application session establishment request message from the terminal device, and sends the response message for the first application session establishment request message to the terminal device.

Specifically, the terminal device may not delete the first key and the identification information of the first key after sending the response message for the first authentication request message.

In this manner, after re-authentication occurs, the terminal device still derives the communication key between the terminal device and the application function network element by using the first key generated before the re-authentication, to ensure that the communication key between the terminal device and the application function network element obtained by the application function network element is consistent with the communication key derived by the terminal device. Therefore, it is ensured that the terminal device and the application function network element successfully agree on the communication key between the terminal device and the application function network element, to implement secure communication between the terminal device and the application function network element.

In another possible implementation, the terminal device is configured to send a first application session establishment request message to the application function network element, where the first application session establishment request message carries identification information of a first key, and the first key is an authentication and key management for applications AKMA key. The terminal device receives a first authentication request message in a procedure of the re-authentication; sends a response message for the first authentication request message in the procedure of the re-authentication; receives a response message for the first application session establishment request message from the application function network element; and sends a second application session establishment request message to the application function network element, where the second application session establishment request message carries identification information of a second key, and the second key is an AKMA key generated after the procedure of the re-authentication.

The application function network element receives the first application session establishment request message from the terminal device; sends the response message for the first application session establishment request message to the terminal device; and receives the second application session establishment request message from the terminal device.

In this manner, before re-authentication occurs, the terminal device initiates an application session establishment procedure to the application function network element by using the identification information of the first key generated before the re-authentication. After the re-authentication occurs, the terminal device re-initiates an application session establishment procedure to the application function network element by using the identification information of the second key generated after the re-authentication. Therefore, it is ensured that the terminal device and the application function network element successfully agree on a communication key between the terminal device and the application function network element, to implement secure communication between the terminal device and the application function network element.

Figure 9:
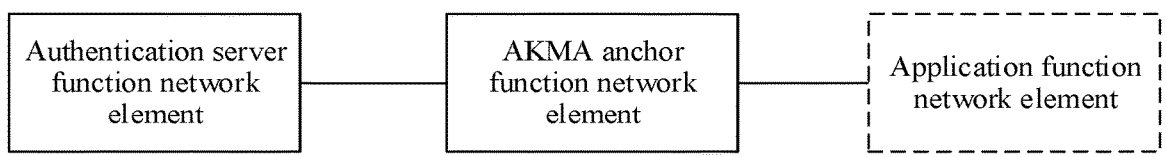
FIG. 9 is a schematic architectural diagram of another key management system according to this application.

FIG. 9 is a schematic architectural diagram of another key management system according to this application. The system includes at least one authentication server function network element and at least one AKMA anchor function network element. The authentication server function network element may be an AUSF in a 5G system, or may be a network element configured to implement all or some functions of the AUSF in a future communication system. The AKMA anchor function network element may be an AAnF in the 5G system, or may be a network element configured to implement all or some functions of the AAnF in the future communication system.

The authentication server function network element is configured to: receive a second authentication request in a procedure of re-authentication; send a response message for the second authentication request in the procedure of the re-authentication; receive a first key request message from the AKMA anchor function network element, where the first key request message carries identification information of a first key, and the first key is an AKMA key generated before the procedure of the re-authentication; and send the first key to the AKMA anchor function network element.

The AKMA anchor function network element is configured to: receive a first request message from an application service function network element which can be called as an application function network element, where the first request message is for requesting a communication key between a terminal device and the application function network element; send the first key request message to the authentication server function network element; receive the first key from the authentication server function network element; derive the communication key between the terminal device and the application function network element by using the first key; and send the communication key between the terminal device and the application function network element to the application service function network element.

Specifically, the authentication server function network element is configured not to perform a step of deleting the first key and the identification information of the first key after sending the response message for the second authentication request.

In a possible implementation, the system further includes at least one application service function network element. The application function network element may be an AF in the 5G system, or may be a network element configured to implement all or some functions of the AF in the future communication system. The application service function network element is configured to: receive a first application session establishment request message from the terminal device, where the first application session establishment request message carries the identification information of the first key; send the first request message to the AKMA anchor function network element; receive the communication key between the terminal device and the first application function network element from the AKMA anchor function network element; and send a response message for the first application session establishment request message to the terminal device.

In the system, after re-authentication occurs, the authentication server function network element still sends, to the AKMA anchor function network element, the first key generated before the re-authentication, so that the AKMA anchor function network element generates the communication key between the terminal device and the application function network element by using the first key, to ensure that the communication key between the terminal device and the application function network element generated by the terminal device is consistent with the communication key between the terminal device and the application function network element obtained by the application function network element. Therefore, it is ensured that the terminal device and the application function network element successfully agree on the communication key between the terminal device and the application function network element, to implement secure communication between the terminal device and the application function network element.

The following describes a key management method provided in this application with reference to the network architecture shown in FIG. 8.

Figure 10:
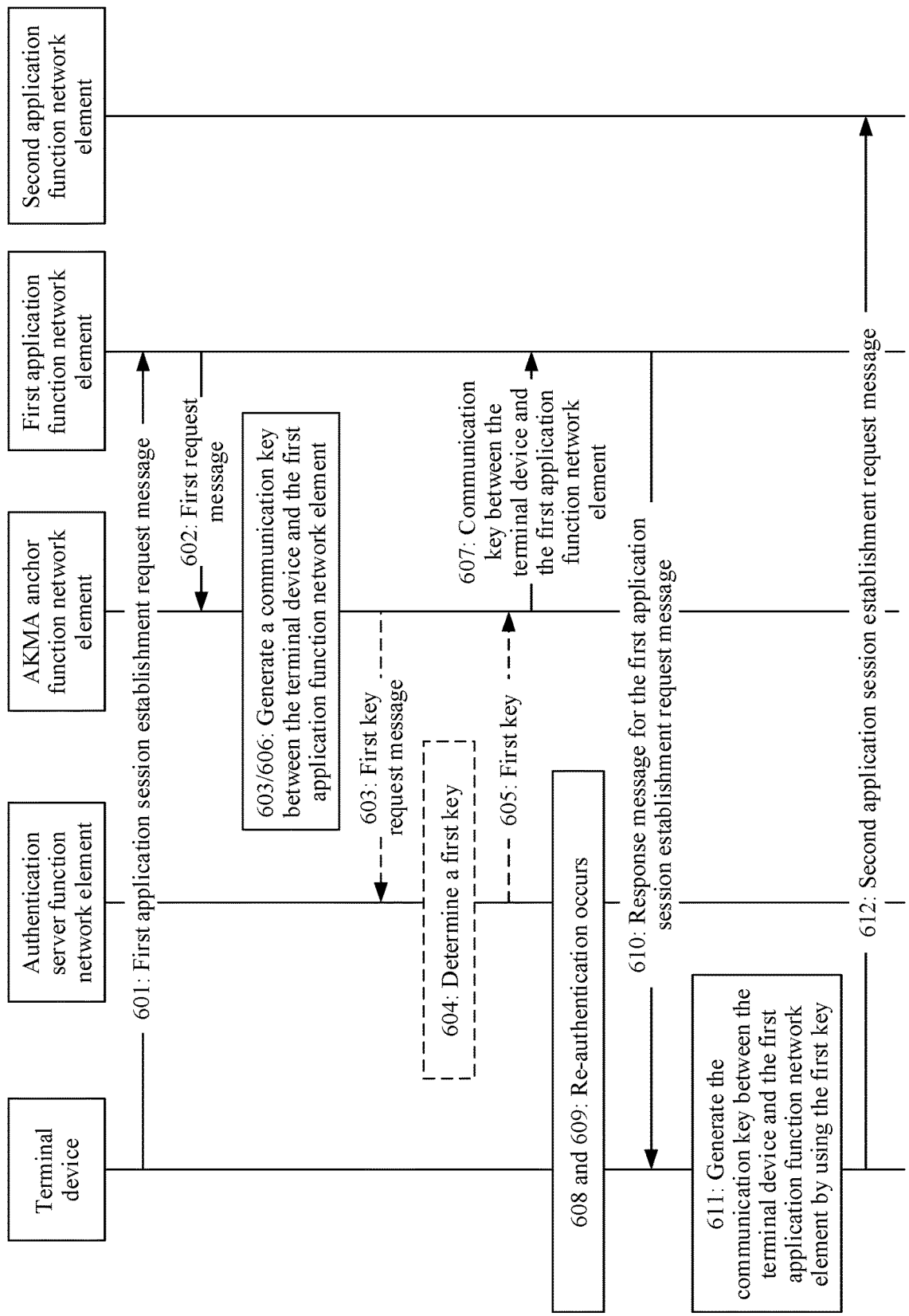
FIG. 10 is a schematic flowchart of a key management method according to this application.

FIG. 10 is a schematic flowchart of a key management method according to this application. The procedure may include but is not limited to the following steps.

Step 601: A terminal device sends a first application session establishment request message to a first application function network element.

The first application session establishment request message carries identification information of a first key, and the first key is an AKMA key.

In an implementation, the terminal device stores the identification information of the first key in a first application session context. The terminal device associates the identification information of the first key with a first application session, that is, the terminal device stores a correspondence between the identification information of the first key and the first application session.

Step 602: After receiving the first application session establishment request message, the first application function network element sends a first request message to an AKMA anchor function network element.

The first request message is for requesting a communication key between the terminal device and the first application function network element. The first request message carries the identification information of the first key and identification information of the first application function network element.

Step 603: After receiving the first request message, if the AKMA anchor function network element stores a correspondence between the identification information of the first key and the first key, the AKMA anchor function network element determines the first key based on the identification information of the first key, and directly generates the communication key between the terminal device and the first application function network element by using the determined first key, and steps 607 to 612 continue to be performed. Optionally, the AKMA anchor function network element further generates validity time of the communication key between the terminal device and the first application function network element.

If the AKMA anchor function network element does not store a correspondence between the identification information of the first key and the first key, the AKMA anchor function network element sends a first key request message to an authentication server function network element, and steps 604 to 612 continue to be performed. The first key request message carries the identification information of the first key.

In an implementation, in addition to generating the communication key between the terminal device and the first application function network element by using the first key, the AKMA anchor function network element may further generate the communication key between the terminal device and the first application function network element by using a part or all of the identification information of the first key or a part or all of the identification information of the first application function network element. The AKMA anchor function network element generates the communication key between the terminal device and the first application function network element by using the part or all of the identification information of the first application function network element, so that communication keys between different application function network elements and a same terminal device are different. For example, the communication key between the first application function network element and the terminal device is a first communication key, and a communication key between a second application function network element and the terminal device is a second communication key different from the first communication key.

Step 604: After receiving the first key request message, the authentication server function network element determines the first key based on the identification information of the first key.

It should be noted that the authentication server function network element may generate the first key after receiving the first key request message; or directly generate the first key based on an intermediate key generated in a primary authentication procedure after the primary authentication procedure. Time at which the authentication server function network element generates the first key is not limited in this application.

Step 605: The authentication server function network element sends the first key to the AKMA anchor function network element.

Step 606: The AKMA anchor function network element generates the communication key between the terminal device and the first application function network element by using the first key.

Optionally, the validity time of the communication key between the terminal device and the first application function network element is further generated.

In an implementation, in addition to generating the communication key between the terminal device and the first application function network element by using the first key, the AKMA anchor function network element may further generate the communication key between the terminal device and the first application function network element by using a part or all of the identification information of the first key or a part or all of the identification information of the first application function network element. For details, refer to the descriptions in step 603. Details are not described herein again.

Step 607: The AKMA anchor function network element sends the communication key between the terminal device and the first application function network element to the first application function network element.

Optionally, the AKMA anchor function network element further sends the validity time of the communication key between the terminal device and the first application function network element to the first application function network element.

Step 608: Re-authentication occurs, where the terminal device receives a first authentication request message in a procedure of the re-authentication.

For details of the procedure of the re-authentication, refer to steps 204 to 209 in FIG. 2. The first authentication request message may be, for example, the first authentication request message in step 206 in FIG. 2. The terminal device receives the first authentication request message from a security anchor function network element in the procedure of the re-authentication.

Step 609: The terminal device sends a response message for the first authentication request message in the procedure of the re-authentication.

The response message for the first authentication request message may be, for example, the response message for the first authentication request message in step 207 in FIG. 2.

In an implementation, after sending the response message for the first authentication request message, the terminal device stores a sequence of sending the first application session establishment request message and performing the procedure of the re-authentication. Specifically, the sequence may be stored in a context of the terminal device, that is, the sequence of the first application session establishment request message and the procedure of the re-authentication is associated with the terminal device.

In an implementation, after sending the response message for the first authentication request message, the terminal device does not delete the first key and the identification information of the first key.

Specifically, a trigger condition for the terminal device to determine not to delete the first key and the identification information of the first key may be any one or more of the following: (1) Re-authentication succeeds. (2) The terminal device sends the first application session establishment request message before the procedure of the re-authentication and does not receive a response message for the first application session establishment request message. (3) The terminal device sends the first application session establishment request message before the procedure of the re-authentication and receives the response message for the first application session establishment request message, but there is no communication key between the terminal device and the first application function network element. (4) There is no available communication key between the terminal device and the first application function network element.

When the re-authentication succeeds, the terminal device determines not to delete the first key and the identification information of the first key. Alternatively, when the terminal device sends the first application session establishment request message before the procedure of the re-authentication and does not receive the response message for the first application session establishment request message, the terminal device determines not to delete the first key and the identification information of the first key. Alternatively, when the terminal device sends the first application session establishment request message before the procedure of the re-authentication, and receives the response message for the first application session establishment request message but does not derive the communication key between the terminal device and the first application function network element, the terminal device determines not to delete the first key and the identification information of the first key. Alternatively, when there is no communication key between the terminal device and the first application function network element, the terminal device determines not to delete the first key and the identification information of the first key.

The terminal device determines that the re-authentication succeeds, to determine not to delete the first key and the identification information of the first key. Alternatively, the terminal device determines that the terminal device sends the first application session establishment request message before the procedure of the re-authentication and does not receive the response message for the first application session establishment request message, to determine not to delete the first key and the identification information of the first key. Alternatively, the terminal device determines that the terminal device sends the first application session establishment request message before the procedure of the re-authentication and receives the response message for the first application session establishment request message, but there is no communication key between the terminal device and the first application function network element, to determine not to delete the first key and the identification information of the first key. Alternatively, the terminal device determines that there is no communication key between the terminal device and the first application function network element, to determine not to delete the first key and the identification information of the first key.

In an implementation, after sending the response message for the first authentication request message, the terminal device generates a second key and identification information of the second key, where the second key is an AKMA key. It may be understood that the first key is an AKMA key generated before the procedure of the re-authentication, and the second key is an AKMA key generated after the procedure of the re-authentication. It should be noted that generating the second key and the identification information of the second key in this application indicates that the second key and the identification information of the second key may be generated at a same moment, or may indicate that the second key and the identification information of the second key are generated at different moments. Correspondingly, generating the first key and the identification information of the first key indicates that the first key and the identification information of the first key may be generated at a same moment, or may indicate that the first key and the identification information of the first key are generated at different moments. Correspondingly, deleting the first key and the identification information of the first key indicates that the first key and the identification information of the first key may be deleted at a same moment, or may indicate that the first key and the identification information of the first key are deleted at different moments. This is not limited in this application. In this manner, the terminal device stores all the second key, the identification information of the second key, the first key, and the identification information of the first key.

Alternatively, in another implementation, after sending the response message for the first authentication request message, the terminal device determines that the first application session establishment request message is initiated before the re-authentication, and suspends initiating an application session establishment request to an application function network element other than the first application function network element until the terminal device and the first application function network element complete an agreement on the communication key. In this case, in a first application session establishment request procedure, the terminal device needs to store only the first key and an identifier of the first key. The terminal device generates the second key when the terminal device completes the agreement on the communication key with the first application function network element and initiates the application session establishment request to the another application function network element. In this way, there is no case in which a plurality of AKMA keys exist on the terminal device, to save storage space of the terminal device, and avoid a determining action of the terminal device selecting a specific AKMA key.

It should be noted that if the AKMA anchor function network element stores the correspondence between the identification information of the first key and the first key in step 603, steps 608 and 609 are performed after step 603. If the AKMA anchor function network element does not store the correspondence between the identification information of the first key and the first key in step 603, steps 608 and 609 are performed after step 605. There is no time sequence relationship between steps 608 and 609 and steps 606 and 607. Steps 608 and 609 may be performed before steps 606 and 607, steps 606 and 607 may be performed before steps 608 and 609, or steps 606 and 607 and steps 608 and 609 may be simultaneously performed. This is not limited in this application.

Step 610: The first application function network element sends the response message for the first application session establishment request message to the terminal device.

After receiving the response message for the first application session establishment request message, the terminal device determines to generate the communication key between the terminal device and the first application function network element by using the first key.

When the first key, the identification information of the first key, the second key, and the identification information of the second key exist on the terminal device, the terminal device may determine to derive the communication key between the terminal device and the first application function network element by using the first key in any one or more of the following manners: (1) When the first application session establishment request message is sent before the procedure of the re-authentication, the terminal device determines to derive the communication key between the terminal device and the first application function network element by using the first key. (2) When the first application session establishment request message carries the identification information of the first key, the terminal device determines to derive the communication key between the terminal device and the first application function network element by using the first key. It should be noted that, for an application session request sent after the procedure of the re-authentication, the terminal device determines to derive the communication key between the terminal device and the first application function network element by using the second key.

The terminal device determines that the first application session establishment request message is sent before the procedure of the re-authentication, to determine to derive the communication key between the terminal device and the first application function network element by using the first key. Alternatively, the terminal device determines that the first application session establishment request message carries the identification information of the first key, to determine to derive the communication key between the terminal device and the first application function network element by using the first key.

Step 611: After receiving the response message for the first application session establishment request message, the terminal device generates the communication key between the terminal device and the first application function network element by using the first key, and performs secure communication with the first application function network element by using the communication key.

In an implementation, in addition to generating the communication key between the terminal device and the first application function network element by using the first key, the terminal device may further generate the communication key between the terminal device and the first application function network element by using a part or all of the identification information of the first key or a part or all of the identification information of the first application function network element. For details, refer to the descriptions in step 603. Details are not described herein again.

In an implementation, after step 611, the terminal device deletes the first key and the identification information of the first key. The terminal device may delete the first key and the identification information of the first key in any one or more of the following manners: (1) The terminal device deletes the first key and the identification information of the first key when each application session request message that carries the identification information of the first key is responded to. (2) The terminal device deletes the first key and the identification information of the first key when each application session request message for which the terminal device does not obtain a response message is sent after the procedure of the re-authentication.

The terminal device determines that each application session request message that carries the identification information of the first key is responded to (or each application session establishment procedure initiated before the re-authentication is completed), to delete the first key and the identification information of the first key. Alternatively, the terminal device determines that each application session request message for which no response message is obtained is sent after the procedure of the re-authentication (or each uncompleted application session establishment procedure is initiated after the re-authentication), to delete the first key and the identification information of the first key.

For example, the terminal device sends, to the first application function network element, the first application session establishment request message that carries the identification information of the first key, and sends, to a third application function network element, a third application session establishment request message that carries the identification information of the first key. The terminal device deletes the first key and the identification information of the first key if the terminal device receives the response message for the first application session establishment request message from the first application function network element and a response message for the third application session establishment request message from the third application function network element after the re-authentication, and no other application session establishment request that carries the identification information of the first key is not responded to.

For another example, the terminal device sends, to the first application function network element, the first application session establishment request message that carries the identification information of the first key. After the re-authentication, the terminal device sends, to a third application function network element, a third application session establishment request message that carries the identification information of the second key. The terminal device deletes the first key and the identification information of the first key if the terminal device receives the response message for the first application session establishment request message from the first application function network element, but does not receive a response message for the third application session establishment request message from the third application function network element, and the application session request message for which no response message is obtained is sent after the procedure of the re-authentication.

Step 612: Optionally, the terminal device sends a second application session establishment request message to the second application function network element, where the second application session establishment request message carries the identification information of the second key.

In the method, after re-authentication occurs, the terminal device still derives a communication key between the terminal device and an application function network element by using a first key generated before the re-authentication, to ensure that the communication key between the terminal device and the application function network element obtained by the application function network element is consistent with the communication key derived by the terminal device. Therefore, it is ensured that the terminal device and the application function network element successfully agree on the communication key between the terminal device and the application function network element, to implement secure communication between the terminal device and the application function network element.

Figure 11:
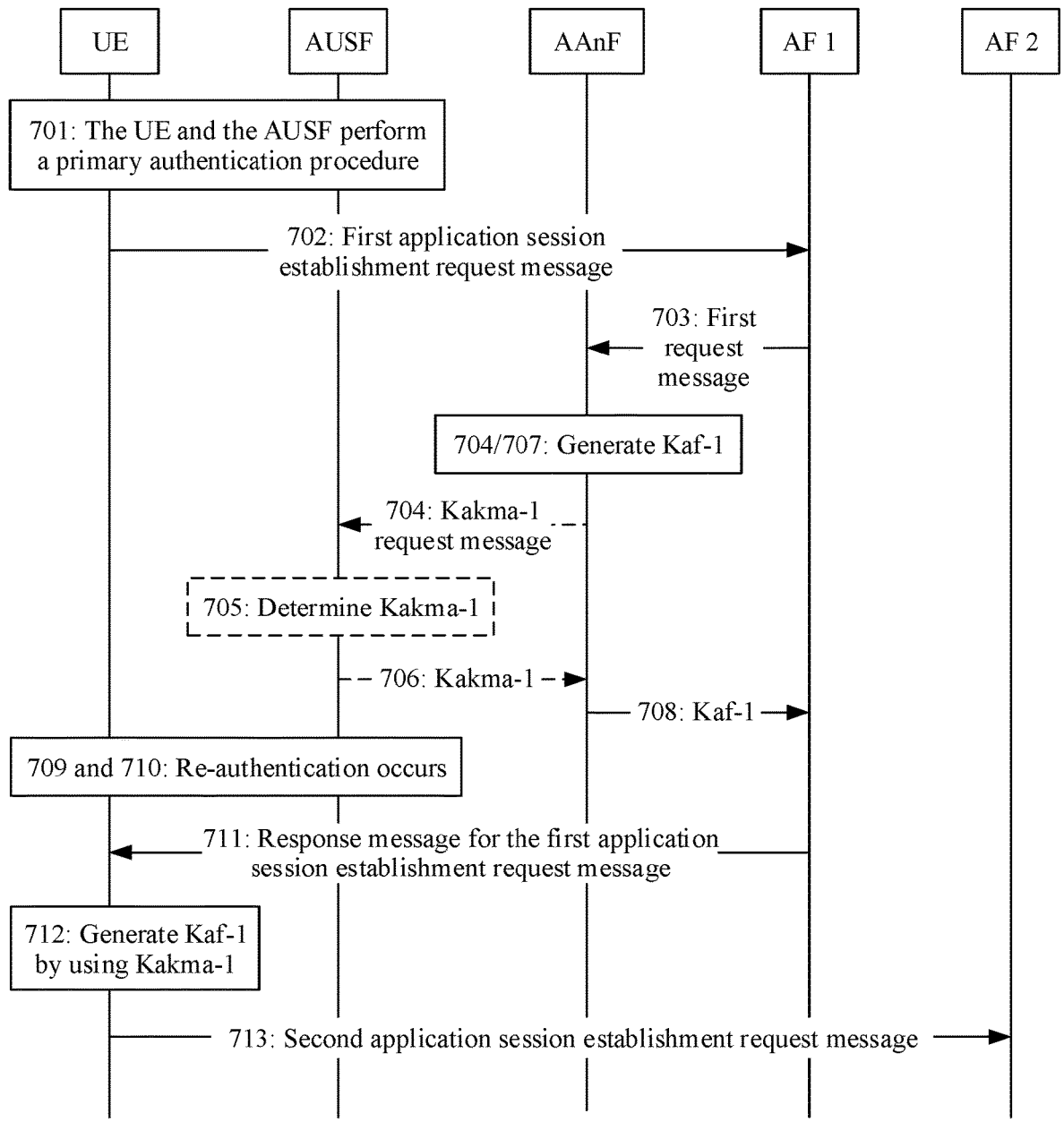
FIG. 11 is a schematic flowchart of a key management method according to this application.

The following describes in detail the key management method provided in FIG. 10 with reference to the network architecture shown in FIG. 2. FIG. 11 is a schematic flowchart of a key management method according to this application. The procedure may include but is not limited to the following steps.

Step 701: UE and an AUSF perform a primary authentication procedure, and the UE generates Kakma-1 and an A-KID-1 corresponding to Kakma.

For the primary authentication procedure and generation of Kakma and an A-KID by the UE, refer to the descriptions in FIG. 3 and FIG. 4. Details are not described herein again.

The A-KID generated by the UE is unique, that is, one A-KID identifies one Kakma. There is a one-to-one relationship between an A-KID and Kakma, and different Kakma corresponds to different A-KIDs.

Step 702: The UE sends a first application session request message to an AF 1, where the A-KID-1 is carried in the first application session request message.

The first application session request message is, for example, an application session establishment request.

In an implementation, the UE may store the A-KID-1 in a first application session context. The UE associates the A-KID-1 with a first application session.

Step 703: After receiving the first application session request message, the AF 1 sends a first request message to an AAnF.

The first request message is for requesting a communication key Kaf1 between the UE and the AF 1, and carries the A-KID-1 and an ID of the AF 1.

For a service-based interface, the first request message is a service-based message, and a name of the request message is a service-based message name, and may be specifically a key request.

Step 704: If the AAnF stores a correspondence between the A-KID-1 and Kakma-1, the AAnF determines Kakma-1 based on the A-KID-1, and directly generates Kaf-1 by using Kakma-1, and steps 709 to 716 continue to be performed. Optionally, the AAnF further generates validity time of Kaf-1.

If the AAnF does not store a correspondence between the A-KID-1 and Kakma-1, the AAnF sends a Kakma-1 request message to the AUSF, and steps 705 to 716 continue to be performed, where the Kakma-1 request message carries the A-KID-1.

For a service-based interface, the request message used by the AAnF to request Kakma-1 from the AUSF is a service-based message. A name of the request message is a service-based message name, and may be specifically an AKMA key request.

In an implementation, in addition to generating Kaf-1 by using Kakma-1, the AAnF may further generate Kaf-1 by using a part or all of the A-KID-1 or a part or all of the ID of the AF 1. For example, the AAnF derives Kaf-1 by using the A-KID-1 or an A-TID (AKMA-temporary identifier)-1, and the A-KID-1 includes the A-TID-1, that is, the A-TID-1 is a part of the A-KID-1. An AKMA anchor function generates Kaf-1 by using the part or all of the ID of the AF 1, so that Kaf between different AFs and same UE can be different. For example, Kaf between the AF 1 and the UE is Kaf-1, and Kaf between an AF 2 and the UE is Kaf-2.

Step 705: After receiving the Kakma-1 request message, the AUSF determines Kakma-1 based on the A-KID-1.

It should be noted that the AUSF may generate Kakma-1 after receiving the Kakma-1 request message; or directly generate Kakma-1 based on Kausf generated in the primary authentication procedure after the primary authentication procedure.

Step 706: The AUSF sends Kakma-1 to the AAnF.

Specifically, Kakma-1 may be carried in an AKMA key response message and sent to the AAnF.

Step 707: The AAnF generates Kaf-1 by using Kakma-1.

Optionally, the AAnF further generates the validity time of Kaf-1.

In an implementation, in addition to generating Kaf-1 by using Kakma-1, the AAnF may further generate Kaf-1 by using the part or all of the A-KID-1 or the part or all of the ID of the AF 1. For details, refer to the descriptions in step 704. Details are not described herein again.

Step 708: The AAnF sends Kaf-1 to the AF 1.

Optionally, the AAnF further sends the validity time of Kaf-1 to the AF 1.

Specifically, Kaf-1 (optionally further including the validity time of Kaf-1) may be carried in a key response message and sent to the AF 1.

Step 709: A procedure of re-authentication occurs, where the UE receives a first authentication request message in the procedure of the re-authentication.

For details of the procedure of the re-authentication, refer to steps 204 to 209 in FIG. 2. The first authentication request message may be, for example, the first authentication request message in step 206 in FIG. 2. The UE receives the first authentication request message from an AMF in the procedure of the re-authentication.

Step 710: The UE sends a response message for the first authentication request message in the procedure of the re-authentication.

The response message for the first authentication request message may be, for example, the response message for the first authentication request message in step 207 in FIG. 2.

In an implementation, after sending the response message for the first authentication request message, the UE stores a sequence of sending a first application session establishment request message and performing the procedure of the re-authentication. Specifically, the sequence may be stored in a context of the UE, that is, the sequence of the first application session establishment request message and the procedure of the re-authentication is associated with the UE.

In an implementation, after sending the response message for the first authentication request message, the UE does not delete Kakma-1 and the A-KID-1.

Specifically, a trigger condition for the UE not to delete Kakma-1 and the A-KID-1 may be any one or more of the following:

(1) Re-authentication succeeds.
(2) The UE sends the first application session establishment request message before the re-authentication and does not receive the response message for the first application session establishment request message.
(3) There is no available Kaf-1 on the UE.

When the trigger condition for the UE not to delete Kakma-1 and the A-KID-1 includes (1) and (3), the UE deletes Kakma-1 and the A-KID-1 if determining that the re-authentication succeeds and there is no available Kaf-1 on the UE. Alternatively, when the trigger condition for the UE not to delete Kakma-1 and the A-KID-1 includes (2) and (3), the UE deletes Kakma-1 and the A-KID-1 if the UE determines that the first application session establishment request message is sent before the re-authentication and does not receive the response message for the first application session establishment request message is received, and there is no available Kaf-1 on the UE.

When the trigger condition for the UE not to delete Kakma-1 and the A-KID-1 includes (2), the UE may determine, based on the stored sequence of sending the first application session establishment request message and performing the procedure of the re-authentication, whether the condition is met.

It should be noted that the trigger condition may be pre-configured on the UE at delivery of the UE, may be configured on the UE by a network by using configuration information, or may be obtained by the UE from another device before sending the first application session establishment request message or after sending the first application session establishment request message. This is not limited in this application.

In an implementation, after sending the response message for the first authentication request message, the UE generates Kakma-2 and an A-KID-2. It may be understood that Kakma-1 is an AKMA key generated before the procedure of the re-authentication, and Kakma-2 is an AKMA key generated after the procedure of the re-authentication.

Alternatively, in another implementation, after sending the response message for the first authentication request message, the UE determines to initiate the first application session establishment request message to the AF 1 before the re-authentication. After the re-authentication, if an application session establishment request needs to be initiated to another AF (for example, an AF 3), the UE suspends the application session establishment request initiated to the AF 3, and initiates the session establishment request to the AF 3 after a UE side completes an agreement on Kaf-1 with the AF 1. In this manner, in a process in which the UE side performs an agreement on Kaf with the AF 1, the UE stores Kakma-1, the corresponding A-KID-1, and Kausf generated in the procedure of the re-authentication, deletes Kakma-1 and the corresponding A-KID-1 after the UE side completes the agreement on Kaf with the AF 1 and before initiating the session establishment request to the AF 3, and generates Kakma-2 and the corresponding A-KID-2 based on Kausf generated in the procedure of the re-authentication. In this way, the UE stores one Kakma and a corresponding A-KID at a same moment, and does not need to store a plurality of Kakma and a plurality of corresponding A-KIDs, to reduce burden of storing the plurality of Kakma and the plurality of corresponding A-KIDs by the UE.

For a relationship between steps 709 and 710 and steps 707 and 708, refer to the descriptions in step 609. Details are not described herein again.

Step 711: The AF 1 sends the response message for the first application session establishment request message to the UE.

The response message for the first application session establishment request message is, for example, an application session establishment response.

After receiving the response message for the first application session establishment request message, the UE determines to generate Kaf-1 by using Kakma-1.

The UE may determine to generate Kaf-1 by using Kakma-1 in any one or more of the following manners: (1) When the first application session establishment request message is sent before the procedure of the re-authentication, the UE determines to derive Kaf-1 by using Kakma-1. (2) When the first application session establishment request message carries the A-KID-1, the UE determines to derive Kaf-1 by using Kakma-1.

Step 712: After receiving the response message for the first application session establishment request message, the UE generates Kaf-1 by using Kakma-1, and performs secure communication with the AF 1 by using Kaf-1.

In an implementation, in addition to generating Kaf-1 by using Kakma-1, the UE may further generate Kaf-1 by using the part or all of the A-KID-1 or the part or all of the ID of the AF 1. For details, refer to the descriptions in step 704. Details are not described herein again.

In an implementation, after step 712, the UE deletes Kakma-1 and the A-KID-1. The UE deletes Kakma-1 and the A-KID-1 in any one or more of the following manners: (1) The UE deletes Kakma-1 and the A-KID-1 when each application session request message carrying the A-KID-1 is responded to. (2) The UE deletes Kakma-1 and the A-KID-1 when each application session request message for which the UE does not obtain a response message is sent after the procedure of the re-authentication.

Step 713: Optionally, the UE sends a second application session establishment request message to the AF 2, where the second application session establishment request message carries the A-KID-2.

The following describes another key management method provided in this application with reference to the network architecture shown in FIG. 9.

Figure 12:
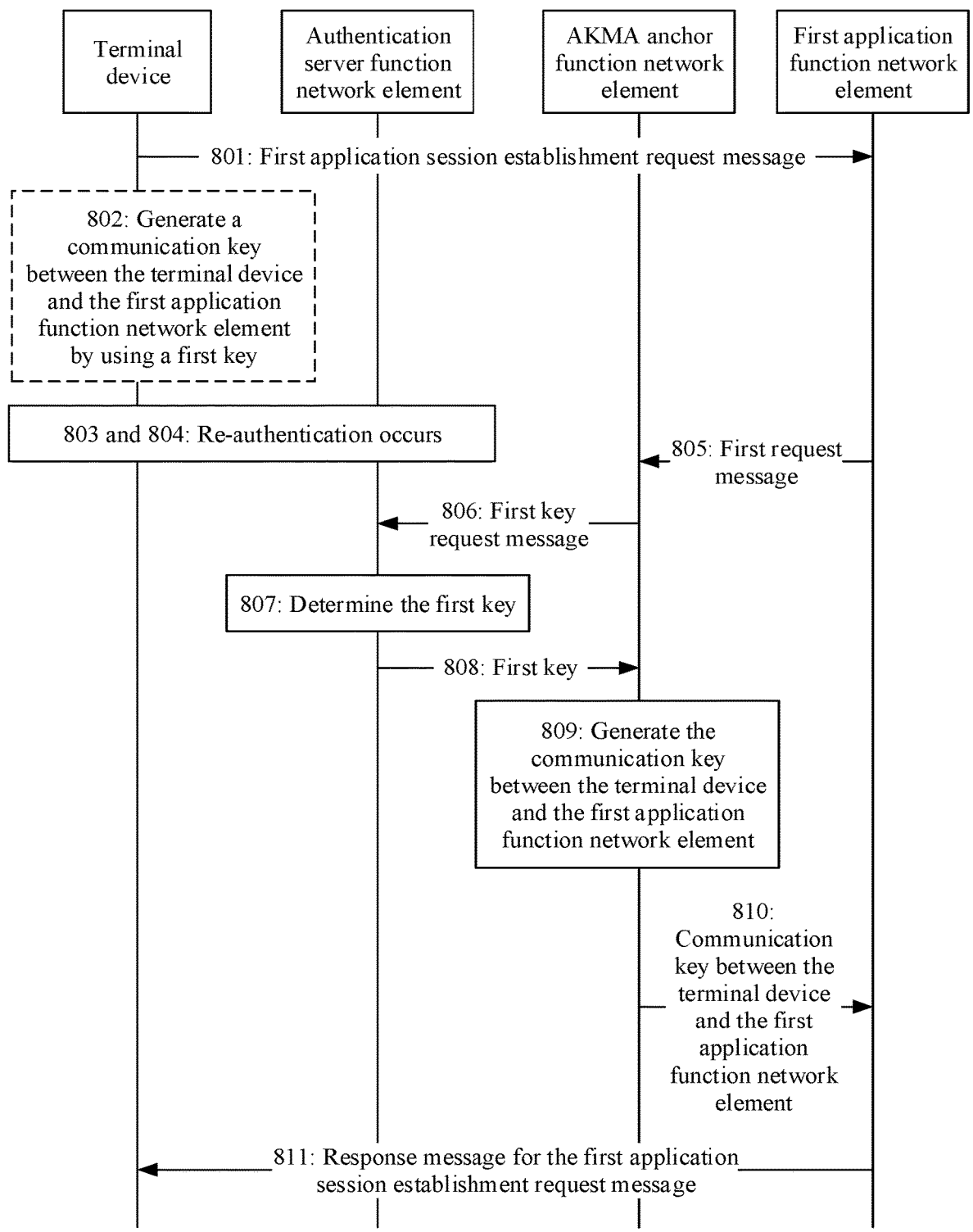
FIG. 12 is a schematic flowchart of another key management method according to this application.

FIG. 12 is a schematic flowchart of another key management method according to this application. The procedure may include but is not limited to the following steps.

Step 801: A terminal device sends a first application session establishment request message to a first application function network element.

The first application session establishment request message carries identification information of a first key, and the first key is an AKMA key.

It may be understood that before step 801, the terminal device stores the first key and the identification information of the first key.

Step 802: Optionally, the terminal device generates a communication key between the terminal device and the first application function network element by using the first key.

If the terminal device does not need a parameter carried in a response message for the first application session establishment request message to generate the communication key between the terminal device and the first application function network element, the terminal device may generate the communication key between the terminal device and the first application function network element after the terminal device generates the first key or after the terminal device sends the first application session establishment request message to the first application function network element. In this way, generation of the communication key between the terminal device and the first application function network element by the terminal device is not affected by re-authentication.

In an implementation, in addition to generating the communication key between the terminal device and the first application function network element by using the first key, the terminal device may further generate the communication key between the terminal device and the first application function network element by using a part or all of the identification information of the first key or a part or all of identification information of the first application function network element. The terminal device generates the communication key between the terminal device and the first application function network element by using the part or all of the identification information of the first application function network element, so that communication keys between different application function network elements and a same terminal device are different. For example, the communication key between the first application function network element and the terminal device is a first communication key, and a communication key between a second application function network element and the terminal device is a second communication key different from the first communication key.

Step 803: Re-authentication occurs, where an authentication server function network element receives a second authentication request in a procedure of the re-authentication.

For details of the procedure of the re-authentication, refer to steps 204 to 209 in FIG. 2. The second authentication request message may be, for example, the second authentication request message in step 208 in FIG. 2. The authentication server function network element receives the second authentication request message from a security anchor function network element in the procedure of the re-authentication.

In an implementation, the second authentication request carries a first indication, and the first indication indicates not to delete the first key and the identification information of the first key.

The first indication may be sent by the terminal device to the security anchor function network element, and then sent by the security anchor function network element to the authentication server function network element. A trigger condition for the terminal device to send the first indication to the authentication server function network element may be any one or more of the following: (1) Re-authentication succeeds. (2) The terminal device sends the first application session establishment request message before the procedure of the re-authentication and does not receive the response message for the first application session establishment request message. (3) The terminal device sends the first application session establishment request message before the procedure of the re-authentication and receives the response message for the first application session establishment request message, but there is no communication key between the terminal device and the first application function network element. (4) There is no available communication key between the terminal device and the first application function network element.

The terminal device determines that the re-authentication succeeds, to send the first indication to the authentication server function network element. Alternatively, the terminal device determines that the terminal device sends the first application session establishment request message before the procedure of the re-authentication and does not receive the response message for the first application session establishment request message, to send the first indication to the authentication server function network element. Alternatively, the terminal device determines that the terminal device sends the first application session establishment request message before the procedure of the re-authentication and receives the response message for the first application session establishment request message, but there is no communication key between the terminal device and the first application function network element, to determine to send the first indication to the authentication server function network element. Alternatively, the terminal device determines that there is no communication key between the terminal device and the first application function network element, to determine to send the first indication to the authentication server function network element.

Step 804: The authentication server function network element sends a response message for the second authentication request message in the procedure of the re-authentication.

The response message for the second authentication request message may be, for example, the response message for the second authentication request message in step 209 in FIG. 2.

In an implementation, the authentication server function network element does not delete the first key and the identification information of the first key after sending the response message for the second authentication request.

The authentication server function network element may determine not to delete the first key and the identification information of the first key in any one of the following manners: (1) The authentication server function network element receives the first indication from the terminal device, and determines, based on the first indication, not to delete the first key and the identification information of the first key. The first indication may be carried in the second authentication request message in step 803. (2) When the procedure of the re-authentication succeeds, the authentication server function network element determines not to delete the first key and the identification information of the first key. The authentication server function network element determines that the procedure of the re-authentication succeeds, to determine not to delete the first key and the identification information of the first key.

The authentication server function network element does not delete the first key and the identification information of the first key for a period of time. A length of the period of time may be determined by an operator. This is not limited in this application.

Optionally, if a data management network element stores the identification information of the first key or information related to the first key, for example, routing information of the authentication server function network element, the data management network element also continues to store the information for a period of time.

In an implementation, the authentication server function network element generates a second key after sending the response message for the second authentication request, where the second key is an AKMA key. It may be understood that the first key is an AKMA key generated before the procedure of the re-authentication, and the second key is an AKMA key generated after the procedure of the re-authentication. In this manner, the authentication server function network element stores all the second key, identification information of the second key, the first key, and the identification information of the first key.

Step 805: After receiving the first application session establishment request message, the first application service function network element sends a first request message to an AKMA anchor function network element.

The first request message is for requesting the communication key between the terminal device and the first application function network element. The first request message carries the identification information of the first key and the identification information of the first application function network element.

Step 806: After receiving the first request message, if the AKMA anchor function network element does not store a correspondence between the identification information of the first key and the first key, the AKMA anchor function network element sends a first key request message to the authentication server function network element. The first key request message carries the identification information of the first key.

In an implementation, the AKMA anchor function network element may search for the routing information of the authentication server function network element by accessing the data management network element, and identification information required for searching for the routing information of the authentication server function network element is the identification information of the first key.

Step 807: After receiving the first key request message, the authentication server function network element determines the first key based on the identification information of the first key.

In an implementation, the authentication server function network element stores all the second key, the identification information of the second key, the first key, and the identification information of the first key, and the authentication server function network element determines the first key based on the identification information of the first key in the first key request message.

The authentication server function network element may generate the first key after receiving the first key request message; or directly generate the first key based on an intermediate key generated in a primary authentication procedure after the primary authentication procedure. Time at which the authentication server function network element generates the first key is not limited in this application.

It should be noted that steps 804 and 805 are performed before step 807. There is no time sequence relationship between steps 804 and 805 and step 806. Steps 804 and 805 may be performed before step 806, steps 804 and 805 may be performed after step 806, or steps 804 and 805 and step 806 may be simultaneously performed. This is not limited in this application.

Step 808: The authentication server function network element sends the first key to the AKMA anchor function network element.

Step 809: The AKMA anchor function network element generates the communication key between the terminal device and the first application function network element by using the first key.

Optionally, the AKMA anchor function network element further generates validity time of the communication key between the terminal device and the first application function network element.

In an implementation, in addition to generating the communication key between the terminal device and the first application function network element by using the first key, the AKMA anchor function network element may further generate the communication key between the terminal device and the first application function network element by using a part or all of the identification information of the first key or a part or all of the identification information of the first application function network element. For details, refer to the descriptions in step 802. Details are not described herein again.

Step 810: The AKMA anchor function network element sends the communication key between the terminal device and the first application function network element to the first application function network element.

Optionally, the AKMA anchor function network element further sends the validity time of the communication key between the terminal device and the first application function network element to the first application function network element.

Step 811: The first application function network element sends the response message for the first application session establishment request message to the terminal device.

In the method, after re-authentication occurs, the authentication server function network element still sends, to the AKMA anchor function network element, the first key generated before the re-authentication, so that the AKMA anchor function network element generates a communication key between a terminal device and an application function network element by using the first key, to ensure that the communication key between the terminal device and the application function network element generated by the terminal device is consistent with the communication key between the terminal device and the application function network element obtained by the application function network element. Therefore, it is ensured that the terminal device and the application function network element successfully agree on the communication key between the terminal device and the application function network element, to implement secure communication between the terminal device and the application function network element.

Figure 13:
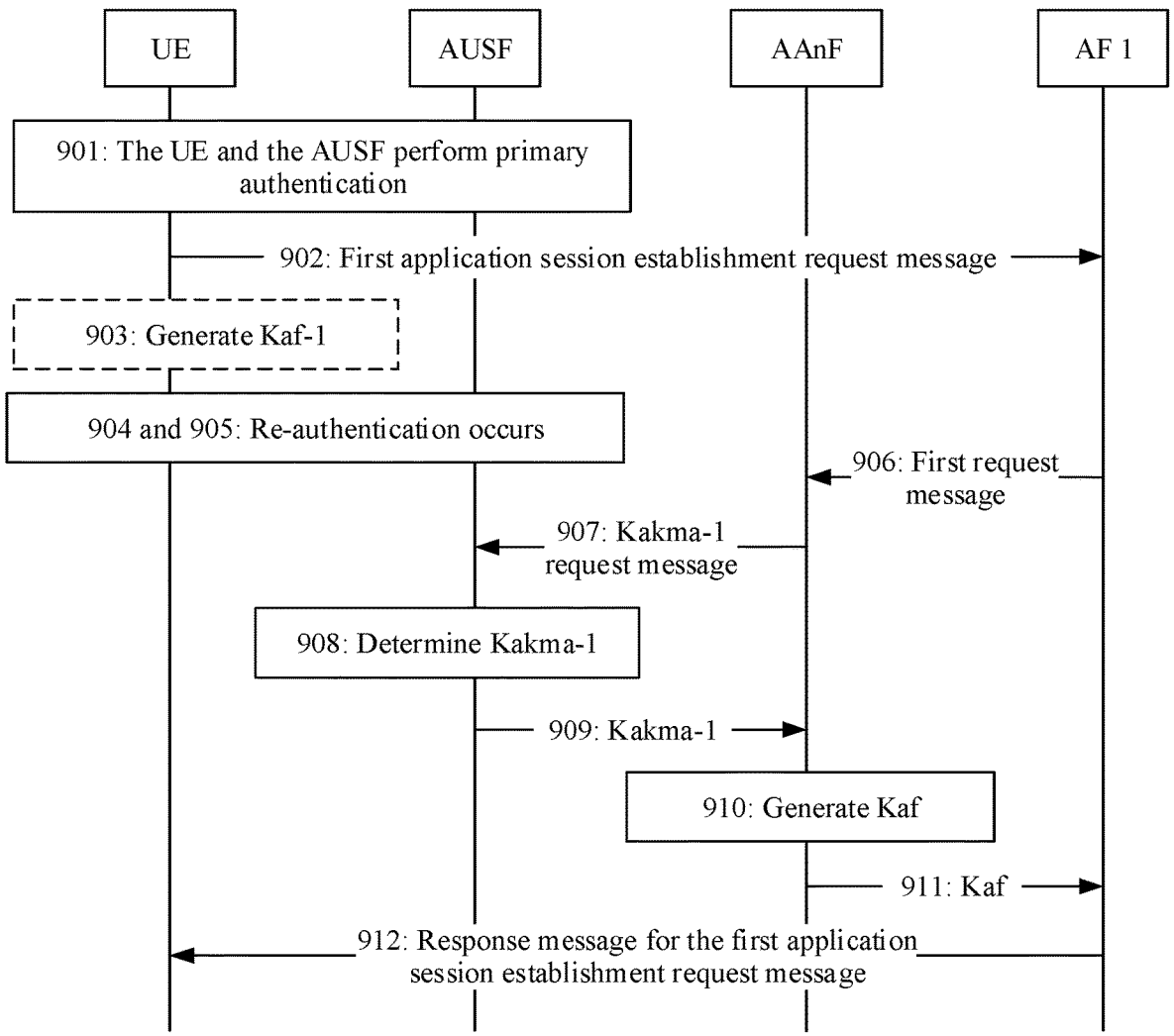
FIG. 13 is a schematic flowchart of another key management method according to this application.

The following describes in detail the key management method provided in FIG. 12 with reference to the network architecture shown in FIG. 2. FIG. 13 is a schematic flowchart of another key management method according to this application. The procedure includes but is not limited to the following steps.

Step 901: UE and an AUSF perform a primary authentication procedure, and the UE generates Kakma-1 and an A-KID-1 corresponding to Kakma.

For the primary authentication procedure and generation of Kakma and an A-KID by the UE, refer to the descriptions in FIG. 3 and FIG. 4. Details are not described herein again.

The A-KID generated by the UE is unique, that is, one A-KID identifies one Kakma. There is a one-to-one relationship between an A-KID and Kakma, and different Kakma corresponds to different A-KIDs.

Step 902: The UE sends a first application session request message to an AF 1, where the first application session request message carries the A-KID-1.

The first application session request message is, for example, an application session establishment request.

Step 903: Optionally, the UE generates Kaf-1 by using Kakma-1.

If the UE does not need a parameter carried in a response message for the first application session establishment request message to generate Kaf-1, the UE may generate Kaf-1 after the UE generates Kakma-1 or after the UE sends the first application session establishment request message to the AF 1. In this way, generation of Kaf-1 by the UE is not affected by re-authentication.

In an implementation, in addition to generating Kaf-1 by using Kakma-1, the UE may further generate Kaf-1 by using a part or all of the A-KID-1 or a part or all of an ID of the AF 1. For example, the UE derives Kaf-1 by using the A-KID-1 or an A-TID-1, and the A-KID-1 includes the A-TID-1, that is, the A-TID-1 is a part of the A-KID-1. The UE generates Kaf-1 by using the part or all of the ID of the AF 1, so that Kaf between different AFs and same UE can be different. For example, Kaf between the AF 1 and the UE is Kaf-1, and Kaf between an AF 2 and the UE is Kaf-2.

Step 904: Re-authentication occurs, where the AUSF receives a second authentication request in a procedure of the re-authentication.

For details of the procedure of the re-authentication, refer to steps 204 to 209 in FIG. 2. The second authentication request message may be, for example, the second authentication request message in step 208 in FIG. 2. The AUSF receives the second authentication request message from an AMF in the procedure of the re-authentication.

In an implementation, the second authentication request carries a first indication, and the first indication indicates not to delete Kakma-1 and the A-KID-1.

The first indication may be sent by the UE to the AMF, and then sent by the AMF to the AUSF. For a trigger condition for the UE to send the first indication to the AUSF, refer to the descriptions in step 803 in FIG. 12. Details are not described herein again.

Step 905: The AUSF sends a response message for the second authentication request message in the procedure of the re-authentication.

The response message for the second authentication request message may be, for example, the response message for the second authentication request message in step 209 in FIG. 2.

In an implementation, after sending the response message for the second authentication request, the AUSF does not delete Kakma-1 and the A-KID-1.

For a specific manner in which the AUSF determines not to delete Kakma-1 and the A-KID-1, refer to the descriptions in step 804 in FIG. 12. Details are not described herein again.

The AUSF does not delete Kakma-1 and the A-KID-1 for a period of time. A length of the period of time may be determined by an operator. This is not limited in this application.

Optionally, if a UDM stores information related to Kakma-1 or the A-KID-1, for example, routing information of the AUSF, the UDM also continues to store the information for a period of time.

In an implementation, after sending the response message for the second authentication request, the AUSF generates Kakma-2. It may be understood that Kakma-1 is an AKMA key generated before the procedure of the re-authentication, and Kakma-2 is an AKMA key generated after the procedure of the re-authentication. In this manner, the AUSF stores all Kakma-2, an A-KID-2, Kakma-1, and the A-KID-1.

Step 906: After receiving the first application session establishment request message, the AF 1 sends a first request message to an AAnF.

The first request message is for requesting Kaf-1. The first request message carries the A-KID-1 and the identifier of the AF 1.

For a service-based interface, the first request message is a service-based message, and a name of the first request message is a service-based message name, and may be specifically a key request.

Step 907: After receiving the first request message, if the AAnF does not store a correspondence between the A-KID-1 and Kakma-1, the AAnF sends a Kakma-1 request message to the AUSF.

For a service-based interface, the Kakma-1 request message is a service-based message, and a name of the Kakma-1 request message is a service-based message name, and may be specifically an AKMA key request. The Kakma-1 request message carries the A-KID-1.

In an implementation, the AAnF may search for the routing information of the AUSF by accessing the UDM, and identification information required for searching for the routing information of the AUSF is the A-KID-1.

Step 908: After receiving the Kakma-1 request message, the AUSF determines Kakma-1 based on the A-KID-1.

In an implementation, the AUSF stores all Kakma-2, the A-KID-2, Kakma-1, and the A-KID-1, and the AUSF determines Kakma-1 based on the A-KID-1 in the first key request message.

It should be noted that steps 905 and 906 are performed before step 908. For a time sequence relationship between steps 905 and 906 and step 907, refer to the descriptions in step 807 in FIG. 12.

Step 909: The AUSF sends Kakma-1 to the AAnF.

Specifically, Kakma-1 may be carried in an AKMA key response message and sent to the AAnF.

Step 910: The AAnF generates Kaf-1 by using Kakma-1.

Optionally, the AAnF further generates validity time of Kaf-1.

In an implementation, in addition to generating Kaf-1 by using Kakma-1, the AAnF may further generate Kaf-1 by using the part or all of the A-KID-1 or the part or all of the ID of the AF 1. For details, refer to the descriptions in step 903. Details are not described herein again.

Step 911: The AAnF sends Kaf-1 to the AF 1.

Optionally, the AAnF further sends the validity time of Kaf-1 to the AF 1.

Specifically, Kaf-1 (optionally further including the validity time of Kaf-1) may be carried in a key response message and sent to the AF 1.

Step 912: The AF 1 sends the response message for the first application session establishment request message to the UE.

The response message for the first application session establishment request message is, for example, an application session establishment response.

Figure 14:
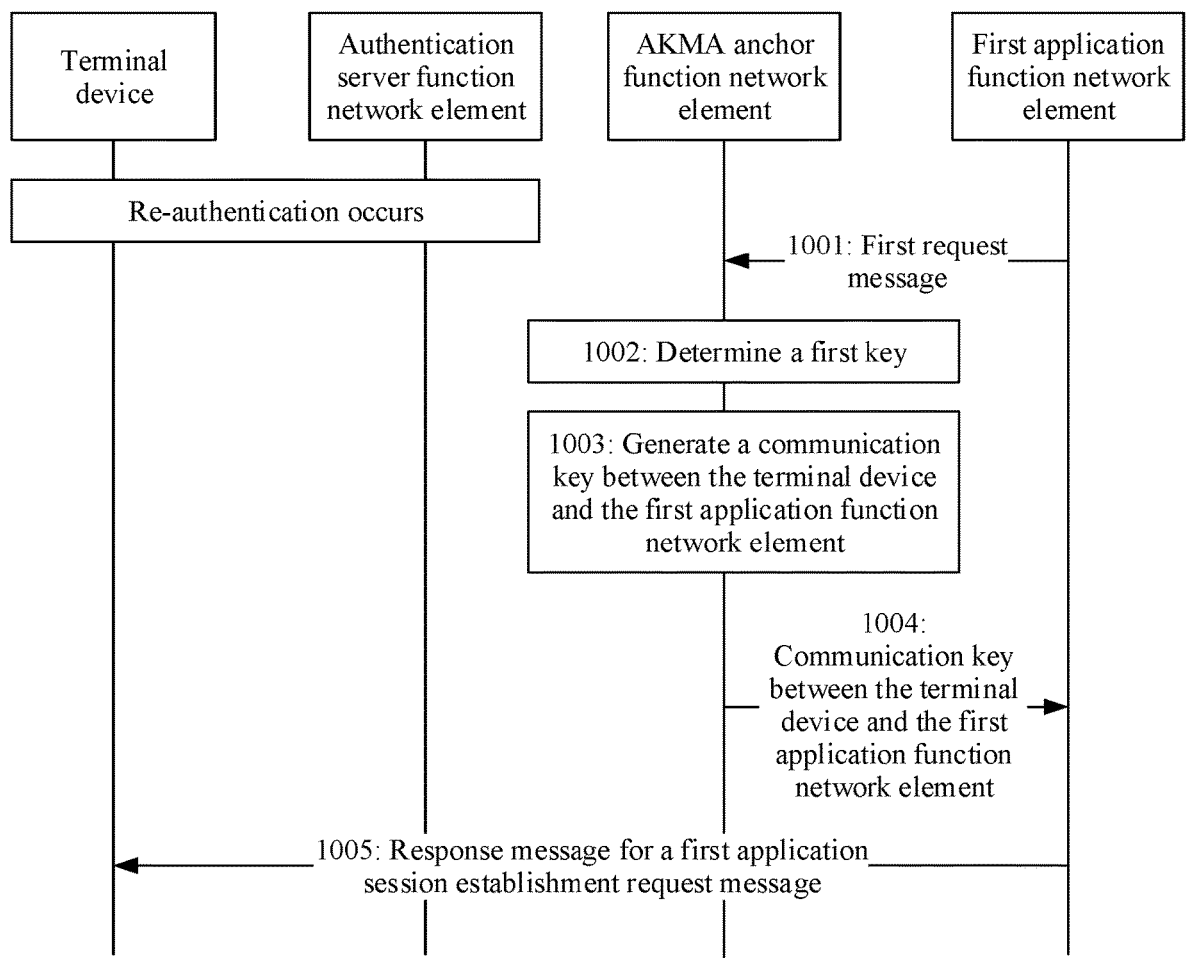
FIG. 14 is a schematic flowchart of still another key management method according to this application.

FIG. 14 is a schematic flowchart of still another key management method according to this application. The procedure may include but is not limited to the following steps.

Step 1001: After a procedure of re-authentication, a first application service function network element sends a first request message to an AKMA anchor function network element.

The first request message is for requesting a communication key between a terminal device and the first application function network element. The first request message carries identification information of a first key and identification information of the first application function network element. The first key is an AKMA key generated before the procedure of the re-authentication.

In an implementation, the AKMA anchor function network element does not delete the first key and the identification information of the first key after the procedure of the re-authentication.

The AKMA anchor function network element may not delete the first key and the identification information of the first key in any one of the following manners: (1) The AKMA anchor function network element receives a second indication from the terminal device or an authentication server function network element, where the second indication indicates not to delete the first key and the identification information of the first key. (2) When the procedure of the re-authentication succeeds, the AKMA anchor function network element determines not to delete the first key and the identification information of the first key. The AKMA anchor function network element determines that the procedure of the re-authentication succeeds, to determine not to delete the first key and the identification information of the first key.

In an implementation, the AKMA anchor function network element obtains a second key after the procedure of the re-authentication, where the second key is an AKMA key generated after the procedure of the re-authentication. In this manner, the AKMA anchor function network element stores all the second key, identification information of the second key, the first key, and the identification information of the first key.

Step 1002: The AKMA anchor function network element determines the first key based on the identification information of the first key.

In an implementation, the AKMA anchor function network element stores all the second key, the identification information of the second key, the first key, and the identification information of the first key, and the AKMA anchor function network element determines the first key based on the identification information of the first key in the first request message.

Step 1003: The AKMA anchor function network element generates the communication key between the terminal device and the first application function network element by using the first key.

Optionally, the AKMA anchor function network element further generates validity time of the communication key between the terminal device and the first application function network element.

In an implementation, in addition to generating the communication key between the terminal device and the first application function network element by using the first key, the AKMA anchor function network element may further generate the communication key between the terminal device and the first application function network element by using a part or all of the identification information of the first key or a part or all of the identification information of the first application function network element. The AKMA anchor function network element generates the communication key between the terminal device and the first application function network element by using the part or all of the identification information of the first application function network element, so that communication keys between different application function network elements and a same terminal device are different. For example, the communication key between the first application function network element and the terminal device is a first communication key, and a communication key between a second application function network element and the terminal device is a second communication key different from the first communication key.

Step 1004: The AKMA anchor function network element sends the communication key between the terminal device and the first application function network element to the application function network element.

Optionally, the AKMA anchor function network element further sends the validity time of the communication key between the terminal device and the first application function network element to the first application function network element.

Step 1005: The first application function network element sends a response message for a first application session establishment request message to the terminal device.

In the method, after re-authentication occurs, the AKMA anchor function network element still generates the communication key between the terminal device and the application function network element by using the first key generated before the re-authentication, to ensure that the communication key between the terminal device and the application function network element generated by the terminal device is consistent with the communication key between the terminal device and the application function network element obtained by the application function network element. Therefore, it is ensured that the terminal device and the application function network element successfully agree on the communication key between the terminal device and the application function network element, to implement secure communication between the terminal device and the application function network element.

The following describes still another key management method provided in this application with reference to the network architecture shown in FIG. 9.

Figure 15:
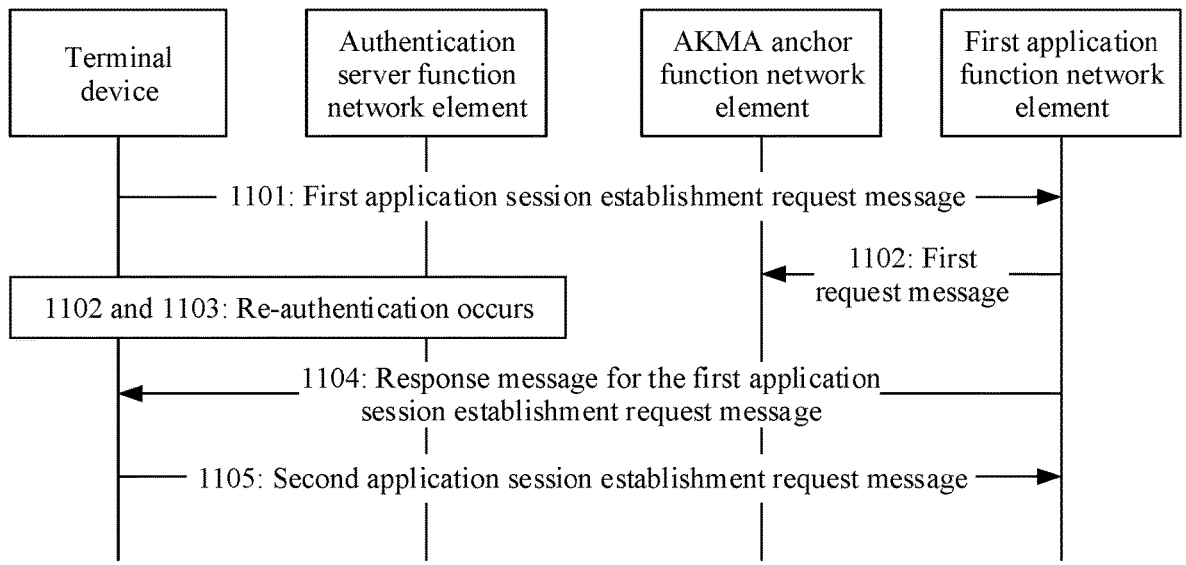
FIG. 15 is a schematic flowchart of yet another key management method according to this application.

FIG. 15 is a schematic flowchart of yet another key management method according to this application. The procedure may include but is not limited to the following steps.

Step 1101: A terminal device sends a first application session establishment request message to a first application function network element.

The first application session establishment request message carries identification information of a first key, and the first key is an AKMA key.

Step 1102: Re-authentication occurs, where the terminal device receives a first authentication request message in a procedure of re-authentication.

For details of the procedure of the re-authentication, refer to steps 204 to 209 in FIG. 2. The first authentication request message may be, for example, the first authentication request message in step 206 in FIG. 2. The terminal device receives the first authentication request message from a security anchor function network element in the procedure of the re-authentication.

Step 1103: The terminal device sends a response message for the first authentication request message in the procedure of the re-authentication.

The response message for the first authentication request message may be, for example, the response message for the first authentication request message in step 207 in FIG. 2.

In an implementation, the terminal device sets a first identifier on the terminal device, where the first identifier identifies that the procedure of the re-authentication is performed on the terminal device; or the first identifier identifies that the terminal device sends the first application session establishment request message before a primary authentication procedure is performed.

Step 1104: The first application function network element sends a response message for the first application session establishment request message to the terminal device.

In an implementation, after receiving the response message for the first application session establishment request message, the terminal device deletes a first application session context.

Step 1105: After receiving the response message for the first application session establishment request message, the terminal device sends a second application session establishment request message to the first application function network element.

The second application session establishment request message carries identification information of a second key, and the second key is an AKMA key generated after the procedure of the re-authentication.

In an implementation, the second application session establishment request message indicates to delete the first application session context, or the second application session establishment request message carries indication information, and the first application function network element deletes the first application session context based on the indication information.

In an implementation, a trigger condition for the terminal device to send the second application session establishment request message to the first application function network element may include any one of the following:

(1) The terminal device sends the second application session establishment request message to a first application function network element, which can be a first application server, based on the first identifier.

(2) If the response message for the first application session establishment request message is securely protected by a communication key between the first application function network element and the terminal device, and the terminal device fails to verify security protection, the terminal device sends the second application session establishment request message to the first application server.

(3) If the terminal device fails to perform secure communication with the first application function network element by using the communication key between the first application function network element and the terminal device after receiving the response message for the first application session establishment request message, the terminal device sends the second application session establishment request message to the first application server.

(4) The terminal device cannot determine the first key corresponding to the identification information of the first key, and therefore cannot generate the communication key between the terminal device and the first application function network element by using the first key.

(5) The terminal device determines a first application session establishment failure based on the response message for the first application session establishment request message. Specifically, the response message for the first application session establishment request message may indicate the first application session establishment failure, or the response message for the first application session establishment request message carries indication information, so that the terminal device determines the first application session establishment failure based on the indication information. The indication information may include any one or more of the following: a third indication, a first failure cause value, and a second failure cause value. The third indication indicates the first application session establishment failure, the first failure cause value indicates that an authentication server function network element cannot be found, the second failure cause value indicates that the first key corresponding to the identification information of the first key cannot be determined, and the authentication server function network element is configured to generate the first key.

For the first application session establishment failure because the authentication server function network element cannot be found, the following steps may be further included between step 1102 and step 1103.

Step 11021: After receiving the first application session establishment request message, the first application function network element sends a first request message to an AKMA anchor function network element.

The first request message is for requesting the communication key between the terminal device and the first application function network element, and the first request message carries the identification information of the first key and identification information of the first application function network element.

Step 11022: The AKMA anchor function network element cannot determine an authentication server function network element corresponding to the identification information of the first key.

In an implementation, the AKMA anchor function network element sends an authentication server function network element path information request message to a data management network element, where the authentication server function network element path information request message carries the identification information of the first key. The AKMA anchor function network element receives a response message for the authentication server function network element path information request message from the data management network element, where the response message for the authentication server function network element path information request message indicates an authentication server function network element path information request failure.

Step 11023: The AKMA anchor function network element sends a response message for the first request message to the first application function network element, where the response message for the first request message indicates a request failure in the communication key between the terminal device and the first application function network element.

Optionally, the AKMA anchor function network element sends the first failure cause value to the first application function network element.

For the first application session establishment failure because the first key corresponding to the identification information of the first key cannot be determined, the following steps may be further included between step 1102 and step 1103.

Step 11024: An authentication server function network element receives a second authentication request in the procedure of the re-authentication.

Step 11025: The authentication server function network element sends a response message for the second authentication request in the procedure of the re-authentication.

Step 11026: After receiving a first request message, an AKMA anchor function network element sends a first key request message to the authentication server function network element.

The first key request message carries the identification information of the first key.

Step 11027: After receiving the first key request message, the authentication server function network element cannot determine the first key corresponding to the identification information of the first key.

Step 11028: The authentication server function network element sends a response message for the first key request message to the AKMA anchor function network element, where the response message for the first key request message indicates a first key request failure.

Optionally, the authentication server function network element sends the second failure cause value to the AKMA anchor function network element, where the second failure cause value indicates that the first key corresponding to the identification information of the first key cannot be determined.

Alternatively, for the first application session establishment failure because the first key corresponding to the identification information of the first key cannot be determined, the following steps may be further included between step 1102 and step 1103.

Step 11029: After receiving the first application session establishment request message, the first application function network element sends a first request message to an AKMA anchor function network element.

The first request message is for requesting the communication key between the terminal device and the first application function network element, and the first request message carries the identification information of the first key and identification information of the first application function network element.

Step 110210: The AKMA anchor function network element cannot determine the first key corresponding to the identification information of the first key.

Step 110211: The AKMA anchor function network element sends a response message for the first request message to the first application function network element, where the response message for the first request message indicates a request failure in the communication key between the terminal device and the first application function network element.

Optionally, the AKMA anchor function network element sends the second failure cause value to the application function network element, where the second failure cause value indicates that the first key corresponding to the identification information of the first key cannot be determined.

Figure 16:
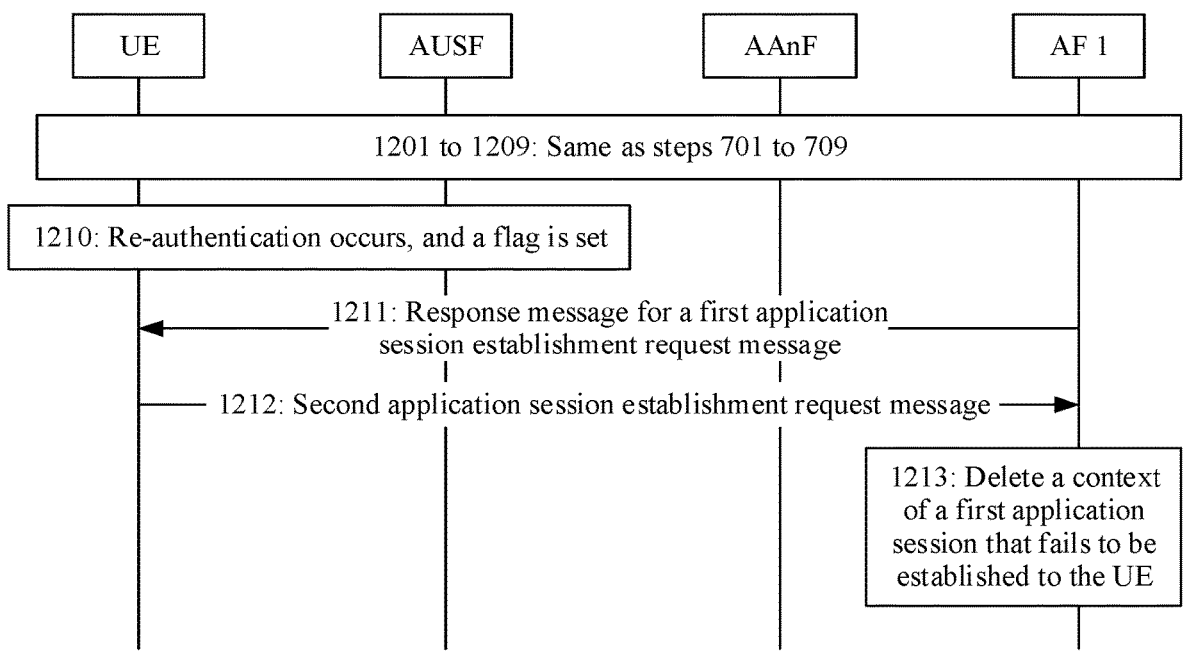
FIG. 16 is a schematic flowchart of yet another key management method according to this application.

The following describes in detail the key management method provided in FIG. 15 with reference to the network architecture shown in FIG. 2. FIG. 16 is a schematic flowchart of yet another key management method according to this application. In the procedure, a terminal device sends a second application session establishment request message to a first application function network element, which can be a first application server, under trigger conditions (1), (2), or (3). The procedure includes but is not limited to the following steps.

Steps 1201 to 1209 are the same as steps 701 to 709 in FIG. 11, and details are not described again.

Step 1210: UE sends a response message for a first authentication request message in a procedure of the re-authentication.

Optionally, the UE sets a flag on the UE. The flag may identify that the UE performs re-authentication, or may identify that the UE sends a first application session establishment request message before re-authentication.

Step 1211: After receiving Kaf (optionally, further receiving validity time of Kaf), an AF 1 sends a response message for the first application session establishment request message to the UE.

The response message for the first application session establishment request message is, for example, an application session establishment response.

Step 1212: After receiving the response message for the first application session establishment request message, the UE releases a first application session, and sends a second application session establishment request message to the AF 1. The second application session establishment request message carries an A-KID-2 generated after the re-authentication.

A trigger condition for the UE to send the second application session establishment request message to the AF 1 may include any one or more of the following:

(1) The UE stores the flag.
(2) If the response message for the first application session establishment request message is securely protected by Kaf-1, the UE fails to verify security protection.
(3) After receiving the response message for the first application session establishment request message, the UE derives Kaf-2 by using Kakma-2, and the UE fails to perform authentication or secure communication with the AF 1 by using Kaf-2.

Optionally, the second application session establishment request message carries indication information, where the indication information indicates a first application session establishment failure or indicates the UE to initiate application session re-establishment, or the second application session establishment request message is for re-establishing an application session between the UE and the AF 1.

In an implementation, the UE deletes a context of the first application session that fails to be established to the AF 1.

Step 1213: After receiving the second application session establishment request message, the AF 1 deletes the context of the first application session that fails to be established to the UE, for example, deletes information such as Kaf-1.

After receiving the second application session establishment request message, the AF 1 and the UE perform an agreement on Kaf-2 based on Kakma-2 and/or the A-KID-2. This is the same as that in a conventional technology, and details are not described.

Figure 17:
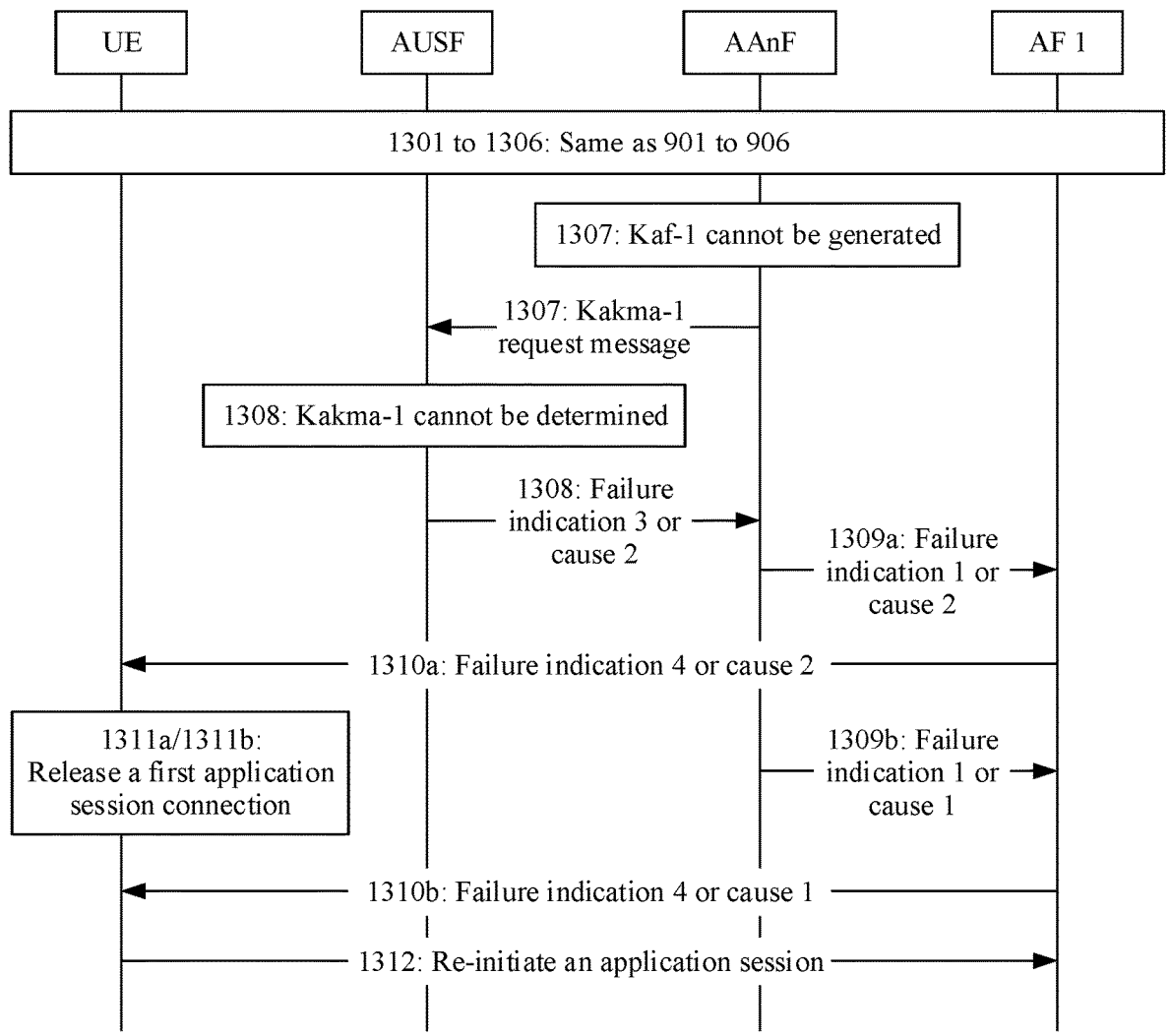
FIG. 17 is a schematic flowchart of yet another key management method according to this application.

The following describes in detail the key management method provided in FIG. 15 with reference to the network architecture shown in FIG. 2. FIG. 17 is a schematic flowchart of yet another key management method according to this application. In the procedure, a terminal device sends a second application session establishment request message to a first application function network element, which can be a first application server, under a trigger condition (4). The procedure includes but is not limited to the following steps.

Steps 1301 to 1306 are the same as steps 901 to 906 in FIG. 13, and details are not described again.

Step 1307: If an AAnF stores Kakma-1 and an A-KID-1 before re-authentication, because Kakma-1 and the A-KID-1 are deleted from the AAnF after the re-authentication, the AAnF cannot find Kakma-1 based on the A-KID-1, and Kaf-1 on an AF side cannot be generated. The AAnF generates a failure indication 1 and steps 1309a to 1311a and 1312 are performed, where the failure indication 1 indicates a Kaf request failure. Optionally, the AAnF further generates a failure cause value 2, a failure cause is that Kakma-1 corresponding to the A-KID-1 cannot be found, and the cause value is denoted as a cause 2.

If the AAnF does not store Kakma-1 and an A-KID-1 when receiving a first request message from an AF 1, the AAnF requests Kakma-1 from an AUSF, and steps 1308, 1309a to 1311a, and 1312 are performed. For a service-based interface, the first request message is a service-based message, and a name of the first request message is a service-based message name, and may be specifically an AKMA key request. The first request message carries the A-KID-1.

In an implementation, the AAnF searches for routing information of the AUSF by accessing a UDM, and identification information required for searching for the routing information of the AUSF is the A-KID-1. Because information related to the A-KID-1 is deleted from the UDM after the re-authentication, the UDM cannot find the routing information of the AUSF based on the A-KID-1, and returns a failure indication 2 to the AAnF. The failure indication 2 indicates that the routing information of the AUSF fails to be found. Optionally, a failure cause value 1 is further returned. A failure cause is that the routing information of the AUSF cannot be found, and the cause value is denoted as a cause 1. After the AAnF receives one or more of the failure indication 2 or the failure cause value 1, steps 1309b to 1311b and 1312 are performed.

Step 1308: The AUSF cannot find corresponding Kakma-1 based on the A-KID-1, and the AUSF returns a failure indication 3 to the AAnF, where the failure indication 3 indicates a Kakma request failure. Optionally, the failure cause value 2 is further returned. The failure cause is that Kakma-1 corresponding to the A-KID-1 cannot be found, and the cause value is denoted as the cause 2.

Step 1309a: The AAnF sends one or more of the failure indication 1 or the cause 2 to the AF 1, where the failure indication 1 indicates the Kaf request failure.

Specifically, one or more of the failure indication 1 or the cause 2 may be carried in a key response message and sent to the AF 1.

Step 1310a: After receiving one or more of the failure indication 1 or the cause 2, the AF 1 sends a response message for a first application session establishment request message to UE. Optionally, the response message for the first application session establishment request message includes one or more of a failure indication 4 or the cause 2, and the failure indication 4 indicates a first application session establishment failure.

The response message for the first application session establishment request message is, for example, an application session establishment response.

Step 1311a: After receiving one or more of the failure indication 4 or the cause 2, the UE releases a first application session connection, and re-initiates an application session establishment process.

Step 1309b: The AAnF sends one or more of the failure indication 1 or the cause 1 to the AF 1, where the failure indication 1 indicates the Kaf request failure.

Specifically, one or more of the failure indication 1 or the cause 1 may be carried in a key response message and sent to the AAnF.

Step 1310b: After receiving one or more of the failure indication 1 or the cause 1, the AF sends a response message for a first application session establishment request message to the UE, where the response message for the first application session establishment request message includes one or more of a failure indication 4 or the cause 1, and the failure indication 4 indicates a first application session establishment failure.

Step 1311b: After receiving one or more of the failure indication 4 or the cause 1, the UE releases a first application session connection, and re-initiates an application session establishment process.

Step 1312: The UE uses an A-KID-2 obtained after the re-authentication to request to establish an application session, which is the same as that in a conventional technology, and details are not described.

Figure 18:
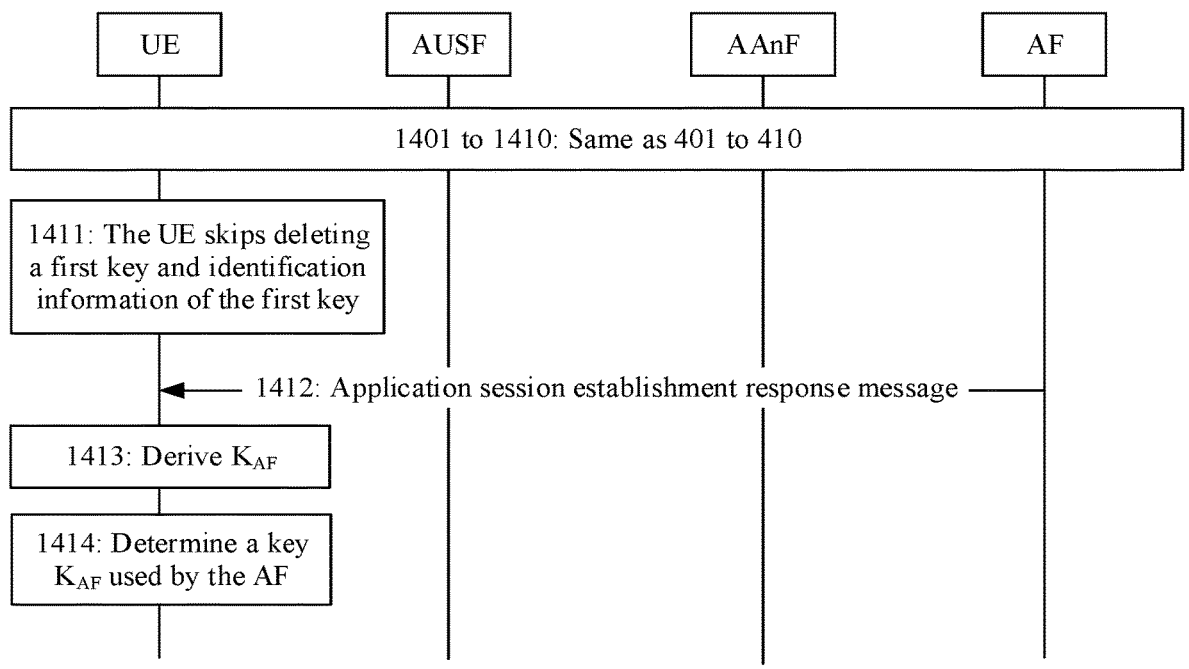
FIG. 18 is a schematic flowchart of a key management method according to this application.

This application further provides a schematic flowchart of a key management method. FIG. 18 is a flowchart of the method. The procedure includes but is not limited to the following steps.

Steps 1401 to 1410 are the same as steps 401 to 410 in FIG. 6, and details are not described again.

Step 1411: UE does not delete a first key and identification information of the first key after re-authentication succeeds. The UE derives second $K_{AKMA}$ by using second $K_{AUSF}$ obtained after the re-authentication. It may be understood that the UE stores two sets of $K_{AKMA}$ and corresponding key identification information.

Step 1412: An AF sends an application session establishment response message to the UE, where the message may carry a derivation parameter for generating $K_{AF}$, a MAC (message authentication code) 1 for integrity protection, and the like, the derivation parameter may be a random number, a counter value, or the like, an input key of the MAC 1 may be $K_{AF}$, and an input parameter may be the entire application session establishment response message or some information elements in the application session establishment response message.

Step 1413: The UE receives the application session establishment response message sent by the AF, and derives $K_{AF}$.

The UE derives $K_{AF}$ based on the derivation parameter and KAKMA. It may be understood that the UE obtains first $K_{AF}$ through derivation based on the derivation parameter and first $K_{AKMA}$, and the UE obtains second $K_{AF}$ through derivation based on the derivation parameter and second $K_{AKMA}$. The derivation parameter carried in the application session establishment response message may be a part or all of the derivation parameter for deriving $K_{AF}$.

Step 1414: The UE determines a key $K_{AF}$ used by the AF.

When the application session establishment response message carries the MAC 1 for integrity protection, the UE respectively calculates a MAC 2 and a MAC 3 by using first $K_{AF}$ and second $K_{AF}$. An input parameter and a security algorithm are the same as those used for calculating the MAC 1.

In this case, the UE separately compares the MAC 1 with the MAC 2 and the MAC 3. When the MAC 1 is the same as the MAC 2, it indicates that the key used by the AF is first $K_{AF}$, and the application session establishment response message is not tampered with. In this case, the UE selects first $K_{AF}$ when performing a subsequent session with the AF, and optionally deletes second $K_{AF}$ and corresponding key identification information. When the MAC 1 is the same as the MAC 3, it indicates that the key used by the AF is second $K_{AF}$, and the application session establishment response message is not tampered with. In this case, the UE selects second $K_{AF}$ when performing a subsequent session with the AF, and optionally deletes first $K_{AF}$ and corresponding key identification information. When the MAC 1 is different from both the MAC 2 and the MAC 3, it indicates that the application session establishment response message may be tampered with, and the UE discards the application session establishment response message. The UE re-initiates an application session establishment process based on a local configuration. To be specific, the UE re-sends an application session establishment request message, where the message carries key identification information of second $K_{AKMA}$ selected when performing a subsequent session with the AF, and optionally deletes first $K_{AF}$, second $K_{AF}$, and the corresponding key identification information. The local configuration may be that the UE re-initiates an application session establishment process when the UE receives an incorrect application session establishment response message for one or more times.

When the application session establishment response message does not carry the MAC 1 for integrity protection, the UE separately attempts to use first $K_{AF}$ and second $K_{AF}$ to perform a subsequent application session service with the AF, and determines, based on a success or a failure of the subsequent application session service, specific $K_{AF}$ that is selected by the UE to use. It may be understood that $K_{AF}$ may be a credential used by the UE and the AF to perform authentication, or a symmetric key used the UE and the AF for communication. The success of the subsequent application session service may be that the UE successfully performs authentication with the AF by using $K_{AF}$, or security protection succeeds when the UE communicates with the AF by using $K_{AF}$ or a derived key thereof. On the contrary, the failure of the subsequent application session service may be that the UE fails to perform authentication with the AF by using $K_{AF}$, or security protection fails when the UE communicates with the AF by using $K_{AF}$ or a derived key thereof. When the UE successfully performs the subsequent application session with the AF by using first $K_{AF}$, it indicates that the key used by the AF is first $K_{AF}$. In this case, the UE selects first $K_{AF}$ when performing the subsequent session with the AF, and optionally deletes second $K_{AF}$ and corresponding key identification information. When the UE fails to perform the subsequent application session with the AF by using first $K_{AF}$, the UE performs the subsequent application session with the AF by using second $K_{AF}$. If the subsequent application session with the AF succeeds, it indicates that the key used by the AF is second $K_{AF}$. In this case, the UE selects second $K_{AF}$ when performing the subsequent session with the AF, and optionally deletes first $K_{AF}$ and corresponding key identification information. When the UE fails to perform the subsequent application session with the AF by using each of first $K_{AF}$ and second $K_{AF}$, the UE re-initiates an application session establishment process based on a local configuration. To be specific, the UE re-sends an application session establishment request message, where the message carries key identification information of second $K_{AKMA}$ selected when performing the subsequent session with the AF, and optionally deletes first $K_{AF}$, second $K_{AF}$, and the corresponding key identification information. The local configuration may be that one or more application session failures occur due to $K_{AF}$ inconsistency between the UE and the AF.

In correspondence to the methods provided in the foregoing method embodiments, an embodiment of this application further provides a key management device. The device includes corresponding modules configured to perform the foregoing embodiments. The modules may be software, hardware, or a combination of software and hardware.

Figure 19:
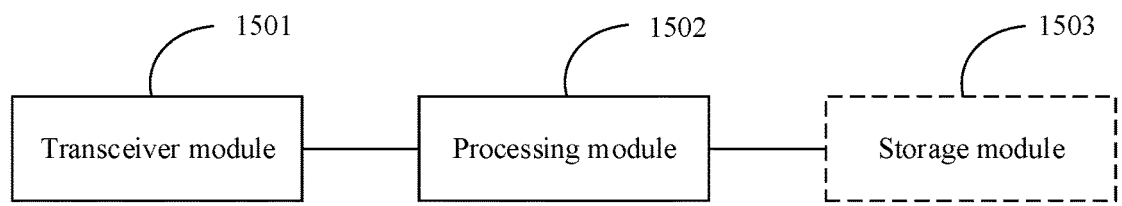
FIG. 19 is a schematic structural diagram of a communication apparatus according to this application.

FIG. 19 is a schematic structural diagram of a communication apparatus according to this application. The communication apparatus 1500 shown in FIG. 19 includes a transceiver module 1501 and a processing module 1502, and optionally, further includes a storage module 1503.

In a design, the apparatus 1500 is a terminal device.

For example, the transceiver module 1501 is configured to: send a first application session establishment request message to a first application function network element, where the first application session establishment request message carries identification information of a first key, and the first key is an authentication and key management for applications AKMA key; receive a first authentication request message in a procedure of re-authentication; send a response message for the first authentication request message in the procedure of the re-authentication; and receive a response message for the first application session establishment request message from the first application function network element. The processing module 1502 is configured to derive a communication key between the terminal device and the first application function network element by using the first key.

Optionally, the processing module 1502 is configured not to perform a step of deleting the first key and the identification information of the first key after the transceiver module 1501 is configured to send the response message for the first authentication request message.

In this example, the apparatus 1500 is configured to implement a function of the terminal device or the UE in the embodiments shown in FIG. 10 to FIG. 18. The processing module 1502 is configured to support the terminal device in performing the methods in the embodiments shown in FIG. 10 to FIG. 18. The transceiver module 1501 is configured to support communication between the terminal device and another device. For details, refer to corresponding descriptions of the terminal device or the UE in FIG. 10 to FIG. 18.

In a design, the apparatus 1500 is an authentication server function network element.

For example, the transceiver module 1501 is configured to: receive a second authentication request in a procedure of re-authentication; send a response message for the second authentication request in the procedure of the re-authentication; receive a first key request message from an authentication and key management for applications AKMA anchor function network element, where the first key request message carries identification information of a first key, and the first key is an AKMA key generated before the procedure of the re-authentication; and send the first key to the AKMA anchor function network element.

Optionally, the processing module 1502 is configured not to perform a step of deleting the first key and the identification information of the first key after the transceiver module 1501 is configured to send the response message for the second authentication request.

The apparatus 1500 is configured to implement a function of the authentication server function network element or the AUSF in the embodiments shown in FIG. 10 to FIG. 18. The processing module 1502 is configured to support the authentication server function network element in performing the methods in the embodiments shown in FIG. 10 to FIG. 18. The transceiver module 1501 is configured to support communication between the authentication server function network element and another device. For details, refer to corresponding descriptions of the authentication server function network element or the AUSF in FIG. 10 to FIG. 18.

In a design, the apparatus 1500 is an authentication and key management for applications AKMA anchor function network element.

For example, after a procedure of re-authentication, the transceiver module 1501 is configured to receive a first request message from a first application function network element, where the first request message is for requesting a communication key between a terminal device and the first application function network element, the first request message carries identification information of a first key, and the first key is an AKMA key generated before the procedure of the re-authentication. The processing module 1502 is configured to derive the communication key between the terminal device and the first application function network element by using the first key. The transceiver module 1501 is further configured to send the communication key to the application function network element.

Optionally, after the procedure of the re-authentication, the processing module 1502 is configured not to perform a step of deleting the first key and the identification information of the first key.

The apparatus 1500 is configured to implement a function of the AKMA anchor function network element or the AAnF in the embodiments shown in FIG. 10 to FIG. 18. The processing module 1502 is configured to support the AKMA anchor function network element in performing the methods in the embodiments shown in FIG. 10 to FIG. 18. The transceiver module 1501 is configured to support communication between the AKMA anchor function network element and another device. For details, refer to corresponding descriptions of the AKMA anchor function network element or the AAnF in FIG. 10 to FIG. 18.

Figure 20:
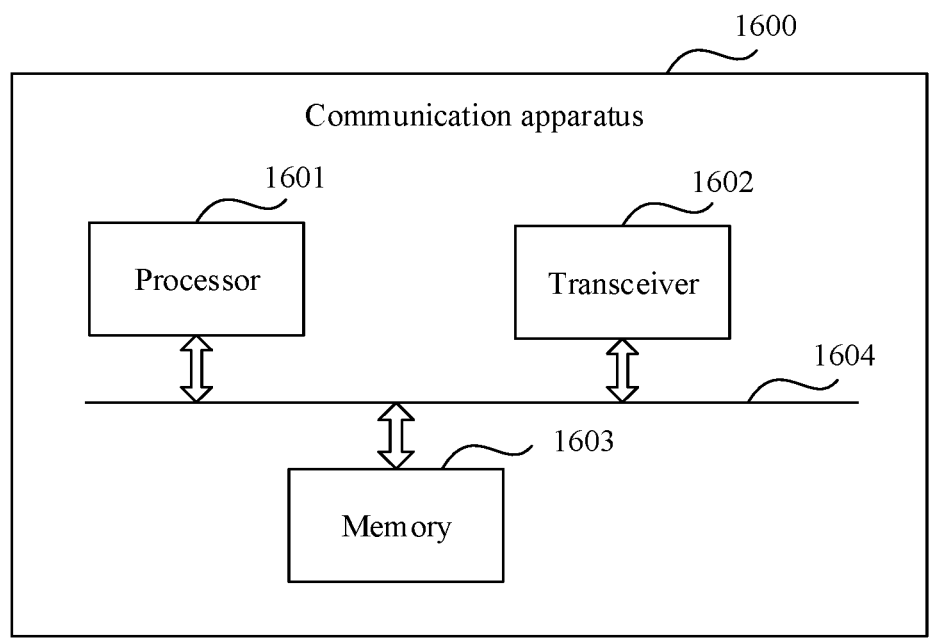
FIG. 20 is a schematic structural diagram of another communication apparatus according to this application.

FIG. 20 is a schematic structural diagram of another communication apparatus according to this application. The communication apparatus 1600 shown in FIG. 20 includes at least one processor 1601 and a transceiver 1602, and optionally, further includes a memory 1603 or a bus 1604. The processor 1601, the transceiver 1602, and the memory 1603 are connected by using the bus 1604. For example, the processor 1601 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to this application. Alternatively, the processor may be a combination of processors implementing a computing function, for example, including a combination of one or more microprocessors, or a combination of a DSP and a microprocessor. The bus 1604 may be a peripheral component interconnect (peripheral component interconnect, PCI for short) bus, an extended industry standard architecture (extended industry standard architecture, EISA for short) bus, or the like. Buses may be classified into an address bus, a data bus, a control bus, and the like. For ease of representation, only one thick line is for representing the bus in FIG. 20, but this does not mean that there is only one bus or only one type of bus.

An embodiment of this application further provides a chip system 1700, including at least one processor 1701 and an interface circuit 1702. The processor 1701 is connected to the interface circuit 1702.

The processor 1701 may be an integrated circuit chip with a signal processing capability. In an implementation process, steps in the foregoing methods can be implemented by using a hardware integrated logical circuit in the processor 1701, or by using instructions in a form of software. The processor 1701 may be a general-purpose processor, a digital signal processor (DSP), an application-specific integrated circuit (ASIC), a field programmable gate array (FPGA) or another programmable logic device, a discrete gate, a transistor logic device, or a discrete hardware component. The processor may implement or perform the methods and steps that are disclosed in embodiments of this application. The general-purpose processor may be a microprocessor, or the processor may be any conventional processor or the like.

The interface circuit 1702 may send or receive data, instructions, or information. The processor 1701 may process data, instructions, or other information received through the interface circuit 1702, and send, through the interface circuit 1702, information obtained after processing.

Optionally, the chip system further includes a memory 1703. The memory 1703 may include a read-only memory and a random access memory, and provide operation instructions and data for the processor. A part of the memory 1703 may further include a non-volatile random access memory (NVRAM).

Optionally, the memory 1703 stores an executable software module or a data structure, and the processor 1703 may perform a corresponding operation by invoking the operation instructions stored in the memory (where the operation instructions may be stored in an operating system).

Optionally, the chip system may be used in the terminal device, the authentication server function network element, or the AKMA anchor function network element in embodiments of this application. Optionally, the interface circuit 1702 is configured to perform receiving and sending steps of the terminal device, the authentication server function network element, or the AKMA anchor function network element in the embodiments shown in FIG. 10 to FIG. 18. The processor 1701 is configured to perform processing steps of the terminal device, the authentication server function network element, or the AKMA anchor function network element in the embodiments shown in FIG. 10 to FIG. 18. The memory 1703 is configured to store data and instructions of the terminal device, the authentication server function network element, or the AKMA anchor function network element in the embodiments shown in FIG. 10 to FIG. 18.

An embodiment of this application further provides a computer-readable storage medium. The methods described in the foregoing method embodiments may be all or partially implemented by software, hardware, firmware, or any combination thereof. If the methods are implemented in the software, functions may be used as one or more instructions or code and stored in the computer-readable medium or transmitted on the computer-readable medium. The computer-readable medium may include a computer storage medium and a communication medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage device, a magnetic disk storage device or another magnetic storage device, or any other medium that can be used to carry or store required program code in a form of instructions or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to transmit software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing method embodiments may be all or partially implemented by software, hardware, firmware, or any combination thereof. If the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a network device, user equipment, or another programmable apparatus.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" may be used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural.

It may be understood that, in embodiments of this application, "B corresponding to A" indicates that B is associated with A, and B may be determined based on A. However, it should be further understood that determining B based on A does not mean that B is determined based on only A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-agree", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiments. Details are not described herein again.

It may be understood that the system, apparatus, and method described in this application may alternatively be implemented in another manner. For example, the described apparatus embodiments are merely examples. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A key management method performed an apparatus which is a terminal device or a component of the terminal device, comprising:
    generating a first authentication and key management for applications (AKMA) key and a first identifier identifying the first AKMA key;
    sending a first application session establishment request message to an application function network element, wherein the first application session establishment request message comprises the first identifier identifying the first AKMA key;
    performing a re-authentication procedure to obtain a second AKMA key and a second identifier identifying the second AKMA key;
    receiving a first application session establishment response message for the first application session establishment request message from the application function network element, wherein the first application session establishment response message indicates a failure of an application session establishment requested by the first application session establishment request; and
    sending based on the first application session establishment response message, a second application session establishment request message to the application function network element, wherein the second application session establishment request message comprises the second identifier identifying the second AKMA key.

2. The method according to claim 1, wherein the re-authentication procedure comprises:
    receiving a non-access stratum (NAS) message authentication request that comprises a first authentication parameter;
    checking the first authentication parameter;
    calculating a second authentication parameter; and sending a NAS message authentication response with the second authentication parameter.

3. The method according to claim 1, wherein the re-authentication procedure is performed after sending the first application session establishment request message.

4. The method according to claim 1, further comprising:
generating a communication key based on the second AKMA key and an identifier of the application function network element, wherein the communication key is used between the application function network element and the apparatus.

5. The method according to claim 1, wherein the re-authentication procedure is performed due to a non-access stratum (NAS) COUNT is about to wrap around.

6. The method according to claim 1, after the performing the re-authentication procedure, the method further comprising:
deleting the first AKMA key and the first identifier that are stored locally; and
storing the second AKMA key and the second identifier identifying the second AKMA key.

7. A key management method, comprising:
receiving, by an application function network element, a first application session establishment request message from a terminal device, wherein the first application session establishment request message comprises a first identifier identifying a first authentication and key management for applications (AKMA) key;
sending, by the application function network element in response to the first application session establishment request message, a first request message to an AKMA anchor function network element to request a communication key between the terminal device and the application function network element, wherein the first request message comprises the first identifier identifying the first AKMA key and an identifier of the application function network element;
receiving, by the application function network element after sending the first request message, a first response message with a second failure indication from the AKMA anchor function network element;
sending, by the application function network element, an application session establishment response message for the first application session establishment request message to the terminal device based on the second failure indication, wherein the application session establishment response message indicates a failure of an application session establishment requested by the first application session establishment request;
receiving, by the application function network element, a second application session establishment request message from the terminal device, wherein the second application session establishment request message comprises a second identifier identifying a second AKMA key;
sending, by the application function network element in response to the second application session establishment request message, a second request message to the AKMA anchor function network element to request the communication key, wherein the second request message comprises the second identifier identifying the second AKMA key and the identifier of the application function network element; and
receiving, by the application function network element after sending the second request message, a second response message with the communication key from the AKMA anchor function network element, wherein the communication key is related to the second identifier identifying the second AKMA key.

8. The method according to claim 7, further comprising:
receiving, by the AKMA anchor function network element from an authentication server function, the second AKMA key and the second identifier identifying the second AKMA key;
deleting, by the AKMA anchor function network element, the first AKMA key and the first identifier that are stored locally; and
storing, by the AKMA anchor function network element, the second AKMA key and the second identifier identifying the second AKMA key.

9. The method according to claim 8, further comprising:
in response to determining that there is no key corresponding to the first identifier, sending, by the AKMA anchor function network element, the first response message with the second failure indication to the application function network element, wherein the second failure indication indicates a failure for requesting the communication key.

10. An apparatus, comprising a processor coupled with a non-transitory memory storing instructions which, when executed by the processor, cause the apparatus to:
generate a first authentication and key management for applications (AKMA) key and a first identifier identifying the first AKMA key;
send a first application session establishment request message to an application function network element, wherein the first application session establishment request message comprises the first identifier identifying the first AKMA key;
perform a re-authentication procedure to obtain a second AKMA key and a second identifier identifying the second AKMA key;
receive an application session establishment response message for the first application session establishment request message from the application function network element, wherein the application session establishment response message indicates a failure of an application session establishment requested by the first application session establishment request; and
send a second application session establishment request message to the application function network element, wherein the second application session establishment request message comprises the second identifier identifying the second AKMA key.

11. The apparatus according to claim 10, wherein the re-authentication procedure comprises:
receiving a non-access stratum (NAS) message authentication request that comprises a first authentication parameter;
checking the first authentication parameter;
calculating a second authentication parameter; and
sending a NAS message authentication response with the second authentication parameter.

12. The apparatus according to claim 10, wherein the re-authentication procedure is performed after sending the first application session establishment request message.

13. The apparatus according to claim 10, wherein the instructions, when executed by the processor, further cause the apparatus to:
generate a communication key based on the second AKMA key and an identifier of the application function network element, wherein the communication key is used between the application function network element and the apparatus.

14. The apparatus according to claim 10, wherein the re-authentication procedure is performed due to a non-access stratum (NAS) COUNT is about to wrap around.

15. The apparatus according to claim 10, wherein the instructions, when executed by the processor, further cause the apparatus to:
delete the first AKMA key and the first identifier that are stored locally; and
store the second AKMA key and the second identifier identifying the second AKMA key.

16. An apparatus, comprising a processor coupled with a non-transitory memory storing instructions that, when executed by the processor, cause the apparatus to:
receive a first application session establishment request message from a terminal device, wherein the first application session establishment request message comprises a first identifier identifying a first authentication and key management for applications (AKMA) key;
send, in response to the first application session establishment request message, a first request message to an AKMA anchor function network element to request a communication key between the terminal device and the application function network element, wherein the first request message comprises the first identifier identifying the first AKMA key and an identifier of the application function network element;
receive, after sending the first request message, a first response message with a second failure indication from the AKMA anchor function network element;
send an application session establishment response message for the first application session establishment request message to the terminal device based on the second failure indication, wherein the application session establishment response message indicates a failure of an application session establishment requested by the first application session establishment request;
receive a second application session establishment request message from the terminal device, wherein the second application session establishment request message comprises a second identifier identifying a second AKMA key;
send, in response to the second application session establishment request message, a second request message to the AKMA anchor function network element to request the communication key, wherein the second request message comprises the second identifier identifying the first AKMA key and the identifier of the application function network element; and
receive, after sending the second request message, a second response message with the communication key from the AKMA anchor function network element, wherein the communication key is related to the second identifier identifying the second AKMA key.

17. A system, comprising an application function network element and an authentication and key management for applications (AKMA) anchor function network element,
wherein the application function network element comprises a processor and is configured to:
receive a first application session establishment request message from a terminal device, wherein the first application session establishment request message comprises a first identifier identifying a first AKMA key;
send, in response to the first application session establishment request message, a first request message to the AKMA anchor function network element to request a communication key between the terminal device and the application function network element, wherein the first request message comprises the first identifier identifying the first AKMA key and an identifier of the application function network element;
receive, after sending the first request message, a first response message with a second failure indication from the AKMA anchor function network element;
send an application session establishment response message for the first application session establishment request message to the terminal device based on the second failure indication, wherein the application session establishment response message indicates a failure of an application session establishment requested by the first application session establishment request;
receive a second application session establishment request message from the terminal device, wherein the second application session establishment request message comprises a second identifier identifying a second AKMA key; and
send, in response to the second application session establishment request message, a second request message to the AKMA anchor function network element to request the communication key, wherein the second request message comprises the second identifier identifying the second AKMA key and the identifier of the application function network element; and
wherein the AKMA anchor function network element comprises a processor and is configured to:
receive the first request message from the application function network element; and
in response to determining that there is no key corresponding to the first identifier, send the first response message to the application function network element.

18. The system according to claim 17, wherein the AKMA anchor function network element is further configured to:
determine the communication key using the second AKMA key and the identifier of the application function network element; and
send a second response message with the communication key to the application function network element.

19. The system according to claim 17, wherein the AKMA anchor function network element is further configured to:
receive, from an authentication server function, the second AKMA key and the second identifier identifying the second AKMA key;
delete the first AKMA key and the first identifier that are stored locally; and
store the second AKMA key and the second identifier identifying the second AKMA key.

20. The system according to claim 19, wherein the first AKMA key and the first identifier stored locally are received from the authentication server function.

* * * * *